(12) United States Patent
McAdoo

(10) Patent No.: US 10,946,604 B2
(45) Date of Patent: Mar. 16, 2021

(54) SYSTEM AND METHOD FOR TIRE RETREADING

(71) Applicant: Sarah Janie McAdoo, Canton, GA (US)

(72) Inventor: Sarah Janie McAdoo, Canton, GA (US)

( * ) Notice: Subject to any disclaimer, the term of this patent is extended or adjusted under 35 U.S.C. 154(b) by 0 days.

(21) Appl. No.: 15/729,456

(22) Filed: Oct. 10, 2017

(65) Prior Publication Data

US 2019/0240939 A1 Aug. 8, 2019

Related U.S. Application Data

(63) Continuation-in-part of application No. PCT/US2016/026894, filed on Apr. 11, 2016, and a continuation-in-part of application No. 14/066,974, filed on Oct. 30, 2013, now Pat. No. 10,744,732.

(60) Provisional application No. 62/145,854, filed on Apr. 10, 2015, provisional application No. 61/720,209, filed on Oct. 30, 2012.

(51) Int. Cl.
    *B29D 30/54* (2006.01)
(52) U.S. Cl.
    CPC ........ *B29D 30/54* (2013.01); *B29D 2030/544* (2013.01); *B29D 2030/545* (2013.01); *B29D 2030/546* (2013.01)
(58) Field of Classification Search
    CPC .. B29D 30/0601; B29D 30/54; B29D 30/542; B29D 30/58; B29D 2030/0677; B29D 2030/544; B29D 2030/545; B29D 2030/546

USPC ...................................................... 156/95, 96
See application file for complete search history.

(56) References Cited

U.S. PATENT DOCUMENTS

| | | | |
|---|---|---|---|
| 2,157,967 A | 5/1939 | Riccio | |
| 2,259,975 A * | 10/1941 | Hewel | B29D 30/54 425/23 |
| 2,570,657 A | 10/1951 | Fannen | |
| 2,904,842 A | 9/1959 | Alm | |
| 2,938,100 A | 5/1960 | Gibbs | |
| 3,038,984 A | 6/1962 | Snyder | |
| 3,060,508 A | 10/1962 | Duerksen | |
| 3,698,975 A | 10/1972 | Hogan | |

(Continued)

FOREIGN PATENT DOCUMENTS

| | | |
|---|---|---|
| CN | 201179708 Y | 1/2009 |
| GB | 12128 | 1/1915 |

(Continued)

OTHER PUBLICATIONS

Shinji Ikeda, JP-08216289-A, machine translations. (Year: 1996).*

(Continued)

*Primary Examiner* — Robert C Dye
*Assistant Examiner* — Sedef E Paquette
(74) *Attorney, Agent, or Firm* — Bodi Law LLC

(57) ABSTRACT

A plurality of embodiments of a method and apparatus for retreading individual tires using one or more electrical heating bands and a component or device to apply a force to the retread tire package comprising a new or used core and a new retread along with an adhesive. In particular, the force may be applied using one or more plates that are connected to actuators for pushing the plates into the retread package to apply the force during curing of the package.

19 Claims, 18 Drawing Sheets

(56) References Cited

U.S. PATENT DOCUMENTS

| | | |
|---|---|---|
| 3,794,452 A | 2/1974 | Wolfe |
| 3,809,592 A | 5/1974 | Dennis et al. |
| 3,868,284 A | 2/1975 | Hogan, Sr. et al. |
| 3,894,897 A | 7/1975 | Batchelor et al. |
| 3,920,498 A | 11/1975 | Everhardt et al. |
| 3,922,415 A | 11/1975 | Dexter |
| 3,964,949 A | 6/1976 | Kent et al. |
| 4,058,422 A | 9/1977 | Taylor |
| 4,201,610 A | 5/1980 | Brodie et al. |
| 4,203,793 A | 5/1980 | Brodie et al. |
| 4,284,451 A | 8/1981 | Conley |
| 4,347,096 A * | 8/1982 | Schorscher ........... B29C 73/305 100/320 |
| 4,536,242 A | 8/1985 | Gripenholt et al. |
| 4,708,608 A * | 11/1987 | DiRocco ................ B29C 33/02 156/381 |
| 4,819,177 A | 4/1989 | Jurgensen |
| 5,007,978 A | 4/1991 | Presti |
| 5,084,080 A | 1/1992 | Hirase et al. |
| 5,098,268 A | 3/1992 | Robinson |
| 5,462,630 A | 10/1995 | Murakami |
| 5,536,348 A | 7/1996 | Chlebina et al. |
| 5,630,894 A | 5/1997 | Koch |
| 5,653,847 A * | 8/1997 | King ..................... B29C 33/301 156/421.6 |
| 5,827,380 A | 10/1998 | Chlebina et al. |
| 5,908,523 A | 6/1999 | Thacher |
| 6,089,290 A | 7/2000 | Chlebina et al. |
| 6,264,779 B1 | 7/2001 | Cappelli et al. |
| 6,267,084 B1 * | 7/2001 | Louchart, III ...... B29C 35/0294 122/4 D |
| 6,630,044 B1 | 10/2003 | Boling et al. |
| 8,109,312 B2 | 2/2012 | Schober |
| 2004/0086336 A1 | 5/2004 | Nelson |
| 2005/0279443 A1 | 12/2005 | Chapman et al. |
| 2009/0165928 A1 * | 7/2009 | Schober ................ B29C 73/12 156/97 |
| 2010/0307622 A1 | 12/2010 | Lee et al. |

FOREIGN PATENT DOCUMENTS

| | | | |
|---|---|---|---|
| JP | 63056438 A * | 3/1988 | ....... B29C 66/91431 |
| JP | 05138764 | 6/1993 | |
| JP | 08216289 A * | 8/1996 | ............ B29D 30/56 |
| JP | 201142093 | 3/2011 | |
| RU | 2154576 C1 | 8/2000 | |
| SU | 1140981 A | 2/1985 | |
| SU | 1308187 A3 | 4/1987 | |
| WO | 2010151263 A1 | 12/2010 | |

OTHER PUBLICATIONS

Shigeru Kijima, JP-63056438-A, machine translation. (Year: 1988).*

Yoshihide Kono, JP 2011042093 A, machine translation. (Year: 2011).*

PCT International Search Report; International Application No. PCT/US2016/026894; Date of Actual Completion of International Search: Jul. 4, 2916; Date of Mailing of International Search Report: dated Aug. 25, 2016.

Wallow Product Catalog (Year: 2011).

* cited by examiner

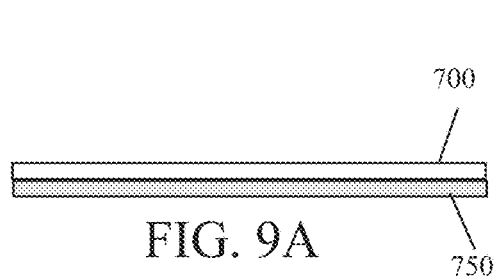
FIG. 9A
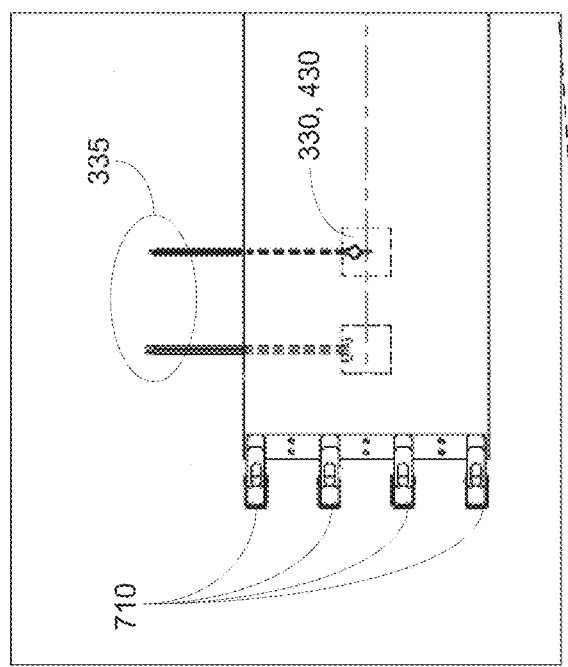
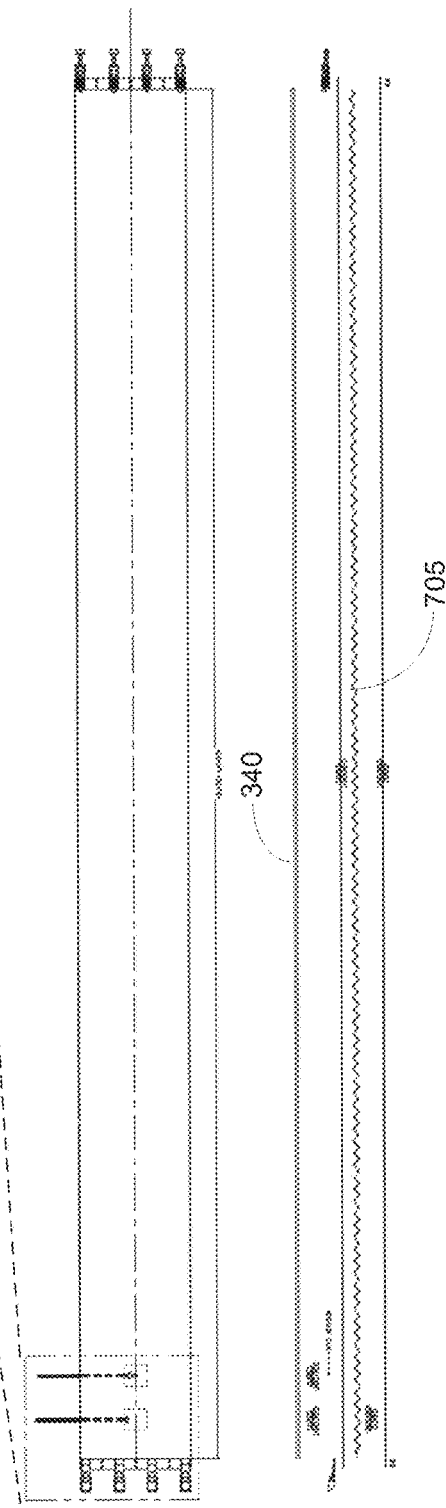
FIG. 9

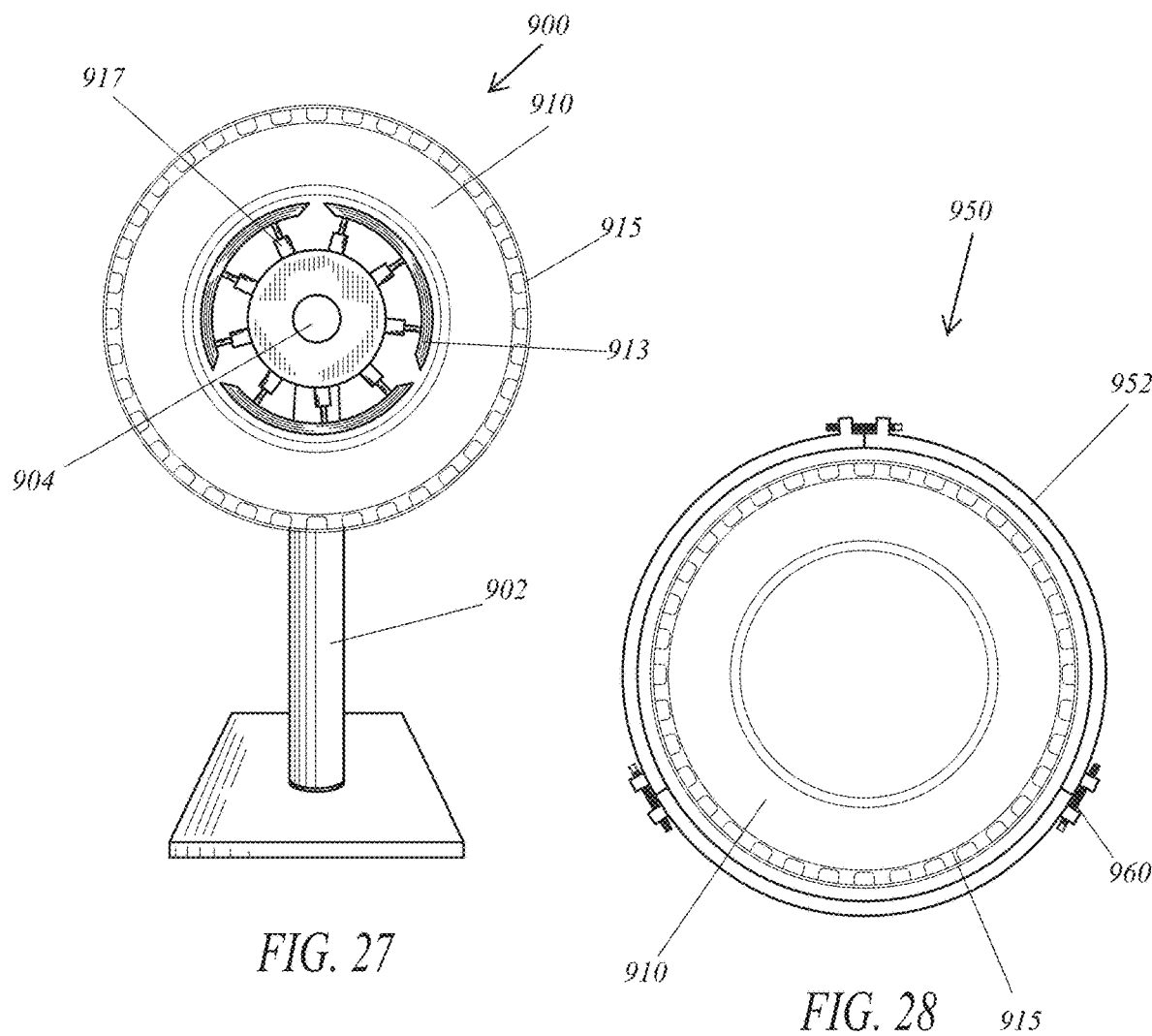
FIG. 27
FIG. 28
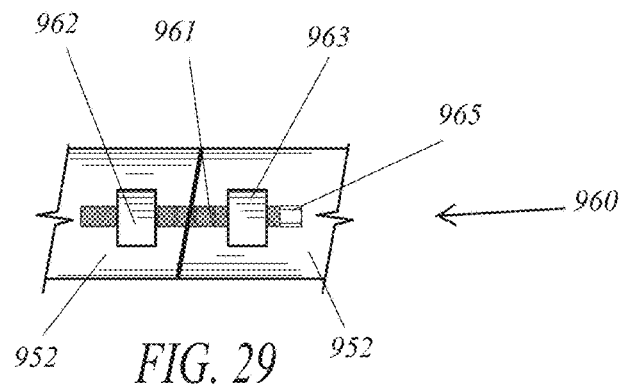
FIG. 29

SYSTEM AND METHOD FOR TIRE RETREADING

CROSS-REFERENCES TO RELATED APPLICATIONS

This application is a continuation-in-part of U.S. patent application Ser. No. 14/066,974 filed on Oct. 30, 2013, which claims the benefit of U.S. Provisional Application Ser. No. 61/720,209 filed on Oct. 30, 2012, both incorporated by reference. This application also claims the benefit of PCT application number PCT/US2016/026894, filed on Apr. 11, 2016, which claims the benefit of U.S. provisional patent application Ser. No. 62/145,854 filed on Apr. 10, 2015, both also incorporated herein by reference.

BACKGROUND

The application relates to tire manufacturing and, more particularly, to a tire retreading system and method that leverages dedicated electric heating pads for targeted, individualized control of the curing process for each of one or more tires that can be individually manufactured.

Traditionally, the casings of used tires can be fitted with new treads and placed back into service. Once the condition of a casing has been qualified, the casing may be conditioned to accept a new retread layer. After conditioning, a hot layer of cushion gum is extruded or wrapped onto the casing to promote a strong tread-to-casing bond. Notably, the layer of cushion gum not only provides a bonding layer between the casing and the new tread layer, but also serves to fill skives and "buzzouts" that may be present on the surface of the casing. After the cushion gum layer is applied, a pre-molded tread layer is wrapped over the cushion gum and temporarily secured in place.

Next, the casing, cushion gum and tread layer retread package is placed inside a vacuum envelope. Some processes utilize a single vacuum envelope applied over the outside of the retread package and sealed against the beads of the casing with rings. Other processes, however, apply inner and outer vacuum envelopes that work together to seal around the entire retread package and apply uniform pressure to the exterior and interior surfaces of the retread package during molding. Other processes use a combination of a vacuum envelope on the outer application to apply a pressure to the retread package during the molding process. A vacuum is applied to the envelope(s), thus pressing the casing, cushion gum layer and tread layer together with a uniform pressure. The enveloped tire package is then placed inside a heated curing chamber (e.g., an autoclave) for the period of time required to bond the layers together and achieve proper cross-linking or curing of the tire.

Multiple retread packages, each comprised of a casing, cushion gum layer and retread layer that are surrounded by a vacuum envelope, may be placed inside a curing chamber or autoclave. Once inside, electric or steam heating elements are used to heat the air inside the curing chamber to a temperature suitable for curing the retread packages. The heated air is circulated around the multiple retread packages in order to cure the tires.

One of ordinary skill in the art will recognize that there are many disadvantages to the retread methods and systems presently known in the art. A few of the disadvantages are:

By using a single, large heating element to heat the air inside the autoclave, present systems and methods are susceptible to manufacturing downtime when a heating element fails.

Because the heated air must be constantly circulated to effectively cure the tire packages, present systems and methods are prone to mechanical failure of the fans.

To heat the air within the autoclave of present systems and methods, it is also necessary to heat the entire curing chamber. Heating the entire chamber is an inefficient, and costly, use of energy.

Because present systems and methods are limited to a single air temperature and curing time, a plurality of retread packages curing in the chamber must comprise identical or similar components. That is, the tires that are being retread in a given curing cycle must be of the same type. This limitation forces manufacturing methods using present retread systems to apply an inefficient "batch" approach.

Because thermal energy intended for curing the retread packages is wasted in the present systems and methods by heating the air and curing chamber, curing cycle times are unnecessarily long.

Therefore, what is desired is a system and method for retreading tires that overcomes one or more of the above limitations and problems, as well as other limitations and problems, of the prior art.

BRIEF SUMMARY

Various embodiments, aspects and features disclosed herein encompass a system and/or a method that leverages dedicated electric heating pad elements for targeted, individualized control of the curing process for each of one or more tires. One preferred and exemplary embodiment is a system that includes an inner vacuum envelope, an outer vacuum envelope, an outer heater pad having an optional insulation layer and/or protective layer and suitable for placement around the surface of a retread layer, an optional inner heater pad having an optional insulation layer and/or protective layer suitable for placement along the interior contour of a tire casing, and a component or device for applying pressure to the package during curing is provided. Other exemplary embodiments may further comprise elements such as, but not limited to, a temperature sensing component, a vacuum source, a pressure source, a curing chamber and a control system.

Provided are a plurality of embodiments of methods and apparatuses for retreading individual tires using one or more electrical heating bands and a component or device to apply a force to the retread tire package comprising a new or used core and a new retread along with an adhesive. In particular, the force may be applied using one or more plates that are connected to actuators for pushing the plates into the retread package to apply the force during curing of the package.

In one exemplary embodiment, a tire casing is fitted with a layer of cushion (Cushing) gum and a retread layer to form a retread package. On the interior of the tire casing, an inner heating pad element with an embedded temperature sensor is placed along the underside contour of the tread such that an insulation layer attached to the heating pad element serves to retard energy generated by the heating pad element from radiating away from the tire. Similarly, on the exterior of the tire casing, an outer heating pad element with an embedded temperature sensor can be placed over the outer surface of the retread layer such that an insulation layer attached to the heating pad element serves to retard energy generated by the heating pad element from radiating away from the tire. Alternatively, the outer heating pad element may be placed on an outside of an envelope such as described below.

Next the retread "package," which includes the casing, cushion gum (or other adhesive) layer, retread layer and inner and/or outer heating pad elements, is provided with a means of pressure during the curing process to ensure that the retread layer stays in forced contact with the tire casing during curing. Control and power wires leading to the inner and outer heating pads may be "slipped" between the mated seal of the inner and outer vacuum envelopes and routed to a control system and power source. Power applied to the inner and outer heating pads supplies thermal energy to the package. The applied pressure and thermal energy operate to cure the retread package to form a usable tire.

There are a number of different ways of applying a force to the retread package disclosed in this application Using rigid plates that may be configurable for differently sized tires, where the rigid plates are made movable using one or more actuators such as electric or mechanical pistons or solenoids can be used. The plates may be provided over the heating pad, if desired, and can be provided around an outer circumference of the retread packages (i.e., to contact the outer surface of the retread), or in an inner circumference of the retread package (i.e., to contact the inner portion of the casing). The plates may be configured in a manner to apply pressure to the entire retread while also preventing the adhesive from leaking out from the retread during curing.

The temperature of the curing process may be monitored and controlled to ensure that proper curing takes place.

Provided are a plurality of example embodiments, including, but not limited to, a method for performing a tire retread, comprising the steps of:
   placing a layer of adhesive on an outer surface of a tire casing;
   placing a retread over the adhesive layer on the tire casing to form a retread package;
   placing a heating device in contact with the retread package;
   applying a force to the retread package to compress the adhesive layer between the tire casing and the retread; and
   while applying said force, using the heating device to heat the retread package to cure said adhesive.

Also provided is a curing package for curing a retread package including a tire casing, a retread, and an adhesive provided between said tire casing and said retread, said curing package comprising: at least one heating device provided in contact with said retread package for providing heat to said retread package during the curing; a structure in contact with said retread package adapted to transmit a force to said retread package for compressing said adhesive between said tire casing and said retread; and a device adapted for providing said force.

BRIEF DESCRIPTION OF THE DRAWINGS

The features and advantages of the example embodiments described herein will become apparent to those skilled in the art to which this disclosure relates upon reading the following description, with reference to the accompanying drawings, in which:

FIG. 9 is a line drawing of an exemplary heating pad element that can be used with one or more embodiments.

FIG. 9A illustrates the heating pad element of FIG. 9 with a protective layer.

FIG. 27 shows an alternative embodiment using internal pressure plates.

FIG. 28 shows an alternative example envelope or clamping system using screw clamps.

FIG. 29 shows a close-up of the screw clamps of the embodiment of FIG. 28.

DETAILED DESCRIPTION OF EXAMPLE EMBODIMENTS

Embodiments and aspects disclosed herein provide a system and/or a method that, for example, leverages dedicated electric heating pad elements (e.g., heating pads) in direct or indirect contact with a tire retread package for targeted, individualized control of the curing process for each of one or more tires. Various embodiments provide for curing a tire retread package, or packages, in at least some embodiments without having to heat and circulate a volume of air. Other embodiments provide for curing a tire retread package, or packages, without having to heat up a curing chamber. Still other embodiments provide for curing a tire retread package, or packages, on an individualized, custom controlled basis such that temperature, pressure, ramp times, soak times, cycle times, cycle profiles and the like may be customized for each retread package of a plurality of retread packages undergoing a simultaneous curing process. Other advantageous features and aspects of the present systems and methods will be apparent to one of ordinary skill in the art.

Figure 1:
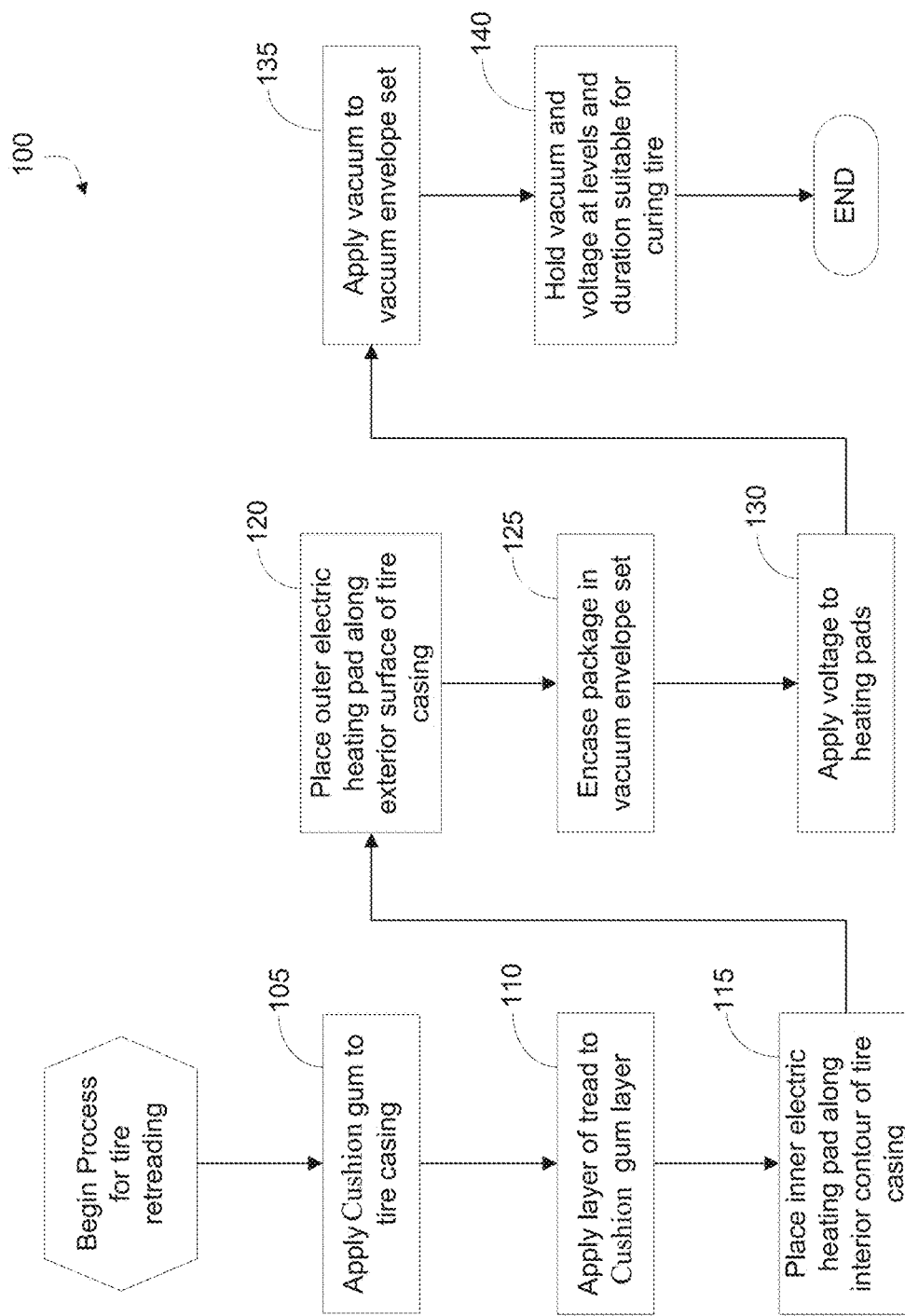
FIG. 1 is a flow chart illustrating an exemplary method for retreading a tire according to one embodiment.

FIG. 1 is a flow chart illustrating an exemplary method 100 for retreading a tire according to one example embodiment. A layer of cushion gum is applied on the exterior of a prepared tire casing 105. A layer of pre-molded tread is applied on the exterior of the cushion gum layer 110. An inner electric heating pad, which may be provided in a long strip about the width of the tire or slightly wider to overlap edges of the retread, is placed along the interior contour of the tire casing 115 in direct or indirect (e.g., with one or more intervening components) contact with the tire casing 115. An outer electric heating pad is placed along the exterior surface of the retread layer 120 in direct or indirect contact (e.g., with one or more intervening components) with the retread layer 120. For at least some embodiments, only one of the inner or outer heating pads may be utilized.

In a situation where an autoclave is to be used to support the retread process, a retread package comprising the tire casing, cushion gum layer, and tread layer is provided with one or more heating pads that are encased in a vacuum envelope set for placing in the autoclave 125. A voltage is applied to the inner and outer electric heating pads 130. Notably, one of ordinary skill in the art will recognize that application of the voltage to the heating pads will cause the heating pads to generate thermal energy, and by controlling the current of the heating pad the generated amount of heat can be controlled. A vacuum is applied to the vacuum envelope set by the autoclave 135. Notably, one of ordinary skill in the art will recognize that applying the vacuum to the vacuum envelope set will serve to compress the casing, cushion gum and tread layers together. The force created by the vacuum pull on the envelope set and the thermal energy generated by the voltage application on the heater pads may be maintained for a period of time suitable to "cure" the tire 140. That is, one of ordinary skill in the art of rubber molding will recognize that holding the casing layer, cushion gum layer and tread layer under pressure (via action of the envelope in the autoclave) and temperature (due to heating by the heating pad or pads and, if utilized, heated air in the autoclave) will cause the layers to be bonded together forming a retreaded tire for sale and use.

The example process of FIG. 1 may be altered in any of a number of ways, some of which are discussed in more detail below. For example, alternative embodiments dispose of the autoclave by providing pressure on the tread for retreading using alternative means, such as by using individual vacuum, plates that are pushed into the package using actuators such as pistons, a mold (such as already used in some retread processes, but by adding one or more heating elements within the retread package inside the mold), or by encompassing the tire in an envelope and then using a compressive band, hydraulic pressure, or using an inner tube placed in an interior of the tire to push outwardly on the wall of the tire casing to push the tire casing outward into the tread and thus into the envelope, providing desired pressure to secure the tread to the tire casing.

Figure 2:
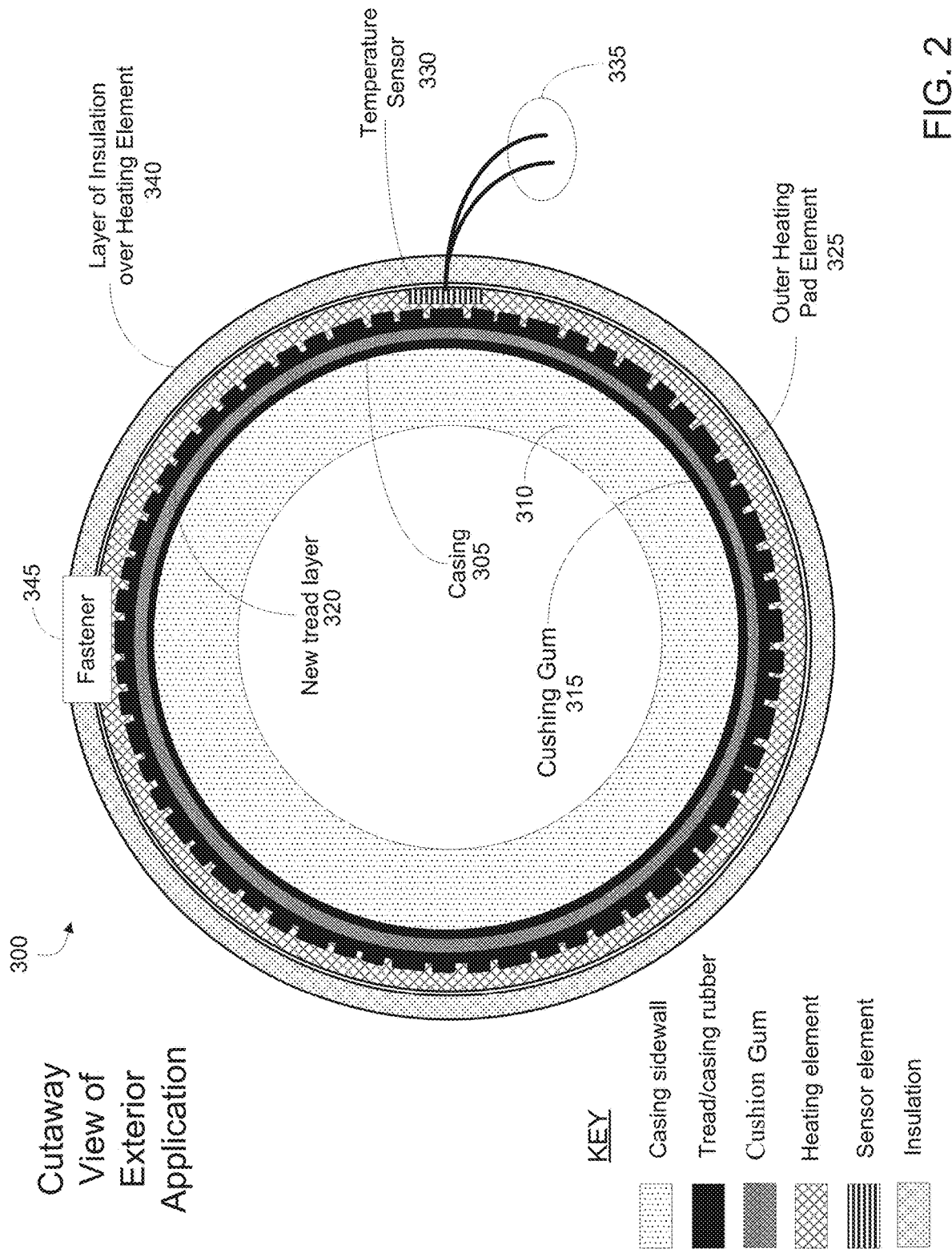
FIG. 2 illustrates a cross-sectional view of an example embodiment of an exterior heating pad application for a tire retread package.

FIG. 2 illustrates a cross-sectional view 300 of an example embodiment using an exterior (outer) heating pad application for a tire retread package. A tire casing 305 having a sidewall 310 is depicted with an applied layer of cushion gum 315 provided on an outer perimeter of the casing 305 and a retread layer 320 provided such that the cushion gum 315 is provided between the retread layers 320 and the tire casing 305. Encircling the exterior surface of the retread layer 320 is an outer heating pad element 325 that comprise electric heating elements and a temperature sensor 330 for monitoring the temperature of the tire. This temperature can be provided to a control system for monitoring the progress and for control of the curing process.

The outer heating pad element 325 can be secured via a fastener mechanism 345 for fastening the ends of the heating pad element 325 together, if desired. Control and power wires 335 connecting to the heating elements (not shown) and temperature sensor 430 are provided leading from the sensor 330 and outer heating pad element 325. The control portion of the wires 335 are provided in communication with the control system. Power to the outer heating pad 325 via the wires 335 cause the heating elements of the outer heating pad element 325 to generate thermal energy useful for causing tread layer 320 to bond to casing 305 via curing of cushion gum layer 315. Curing temperatures may be in the range of 250 to 350 degrees Fahrenheit, for example, although it is envisioned that other curing temperatures outside such range may be applied in some embodiments. Notably, the addition of insulation layer 340 provided over the heating pad element 425 may advantageously retard radiation of thermal energy generated by outer heating pad element 325, thereby insulating the heating pad element and directing generated thermal energy into and through retread layer 320. Alternatively, another envelope may be provided around the retread under the outer heating pad element. The outer heating pad element then may be applied around an exterior of the additional envelope, with the outer envelope provided around the outer heating pad to encase the tire retread package. Use of the additional envelope against the retread package can help to stop Cushion migration between the lugs of the new retread. As mentioned above, only one heating pad may be used.

Figure 3:
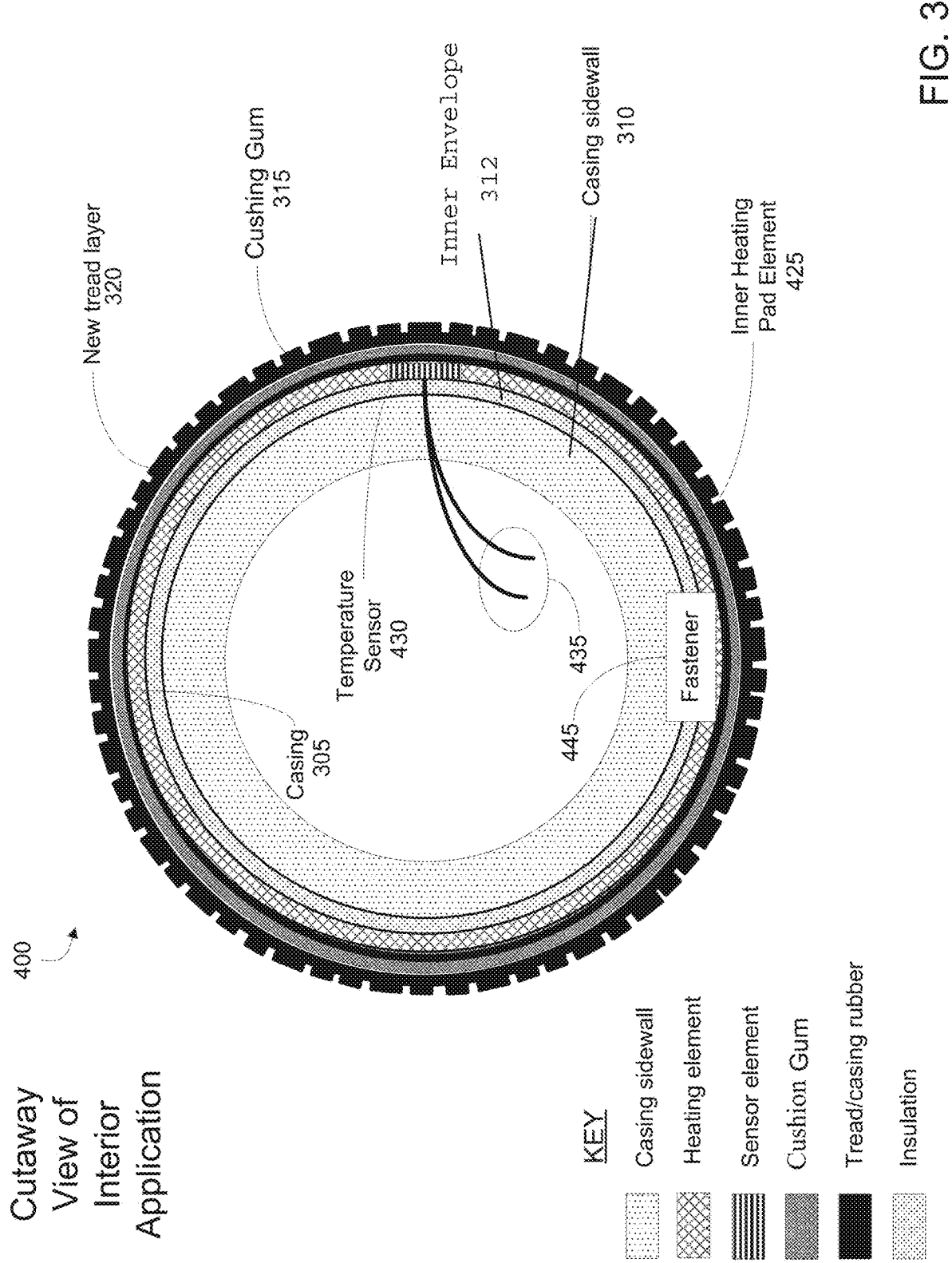
FIG. 3 illustrates a cross-sectional view of an example embodiment of an interior heating pad application for a tire retread package.

FIG. 3 illustrates a cross-sectional view 400 of the interior (inner) heating pad application for a tire retread package, according another example embodiment. As described above relative to view 300 of FIG. 2, the casing 305 is fitted with a layer of Cushion gum 315 and retread layer 320 to form the tire retread package. In the interior of casing 305, an interior heating pad element 425 is placed along the contour of the casing that is proximate to the cushion gum 315 and retread 320 layers. The interior heating pad element 425 may be secured via a fastener mechanism 445 on an inner envelope 312 to hold the heating pad in place, for example, or it may be secured in place through use of an inflatable bladder, such as described below with respect to FIG. 7. Use of the inner envelope 312 and fastener mechanism 445 may be supplemented or may alternatively utilize, other means for ensuring that the interior heating pad element 425 remain in contact with the inner wall of the casing 305, such as by using a stiff substrate or a spring loaded mechanism to push the interior heating pad element 425 outwardly into the tire wall.

Control and power wires 435 are provided leading from the sensor 430 and inner heating pad element 425 to be in communication with a control system. Power to the inner heating pad 425, which can be controlled by the control system, will cause the inner heating pad 425 to generate thermal energy useful for causing tread layer 320 to bond to casing 305 via curing of Cushion gum layer 315. Notably, the addition of an insulation layer (not shown) or an insulated bladder (not shown) may advantageously retard radiation of thermal energy generated by inner heating pad element 425, thereby directing generated thermal energy into and through casing 305 and Cushion gum layer 315.

Figure 4A:
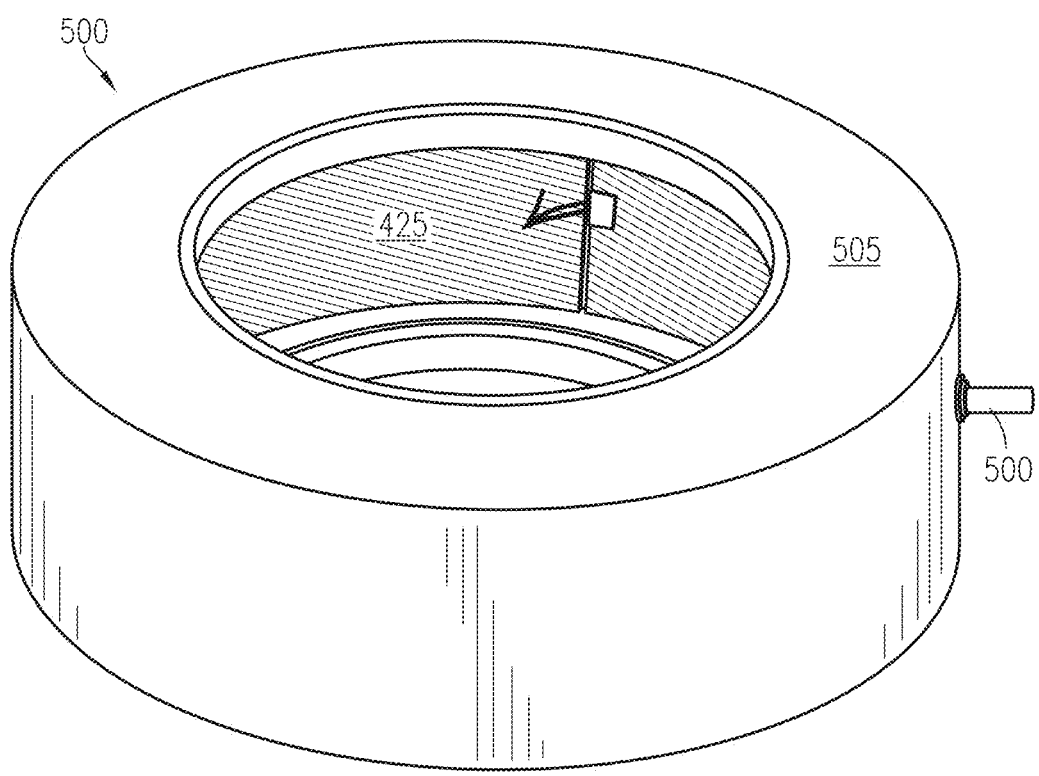
FIG. 4A illustrates an example tire retread package adding an outer vacuum envelope and interior heating pad element such as utilized in FIG. 3.

FIG. 4A is an illustration of an exemplary tire curing package according to an example embodiment, showing an outer vacuum envelope 505 and an interior heating pad element 425 applied to a retread package. Pressure may be applied to the casing, gum rubber (cushion or other adhesive) and retread layer of the retread package via a vacuum drawn from a nozzle 510. The vacuum causes the envelope 505 to "squeeze" the casing, gum rubber and retread together. The envelope 505 could be constructed of a flexible material, such as a rubber or flexible plastic, for example that can be stretched around the retread package, for example. Although not shown, this envelope 505 may be provided with open ends or in more than one piece such that it can be assembled around the tire, tread, and heating element components. These pieces might result in the envelope 505 having a single set of ends for moving apart to allow insertion of the tire package, or it may have two, three, or more seams radially extending from the axis of the tire curing package for assembling two, three, or more arcuate portions of the envelope 505 about the tire, or alternatively the envelope 505 may have a seam around a circumference of the envelope 505 to assembly two halves of the envelope 505 about either side of the tire. A clamp may be provided (such as the clamp shown in FIGS. 5A-5C) to lock the outer vacuum envelope portions in place around the tire. As described above, for some example retread methods, the outer heating pad may be provided in indirect contact with the retread package by arranging the outer heating pad around the outer perimeter (e.g., outer circumference) of the envelope 505 rather than within the envelope in direct contact with the retread 320. Or the heating elements might be incorporated within the envelope. This also avoids the need of passing wires of the outer heating pad through the envelope 505.

Figure 4B:
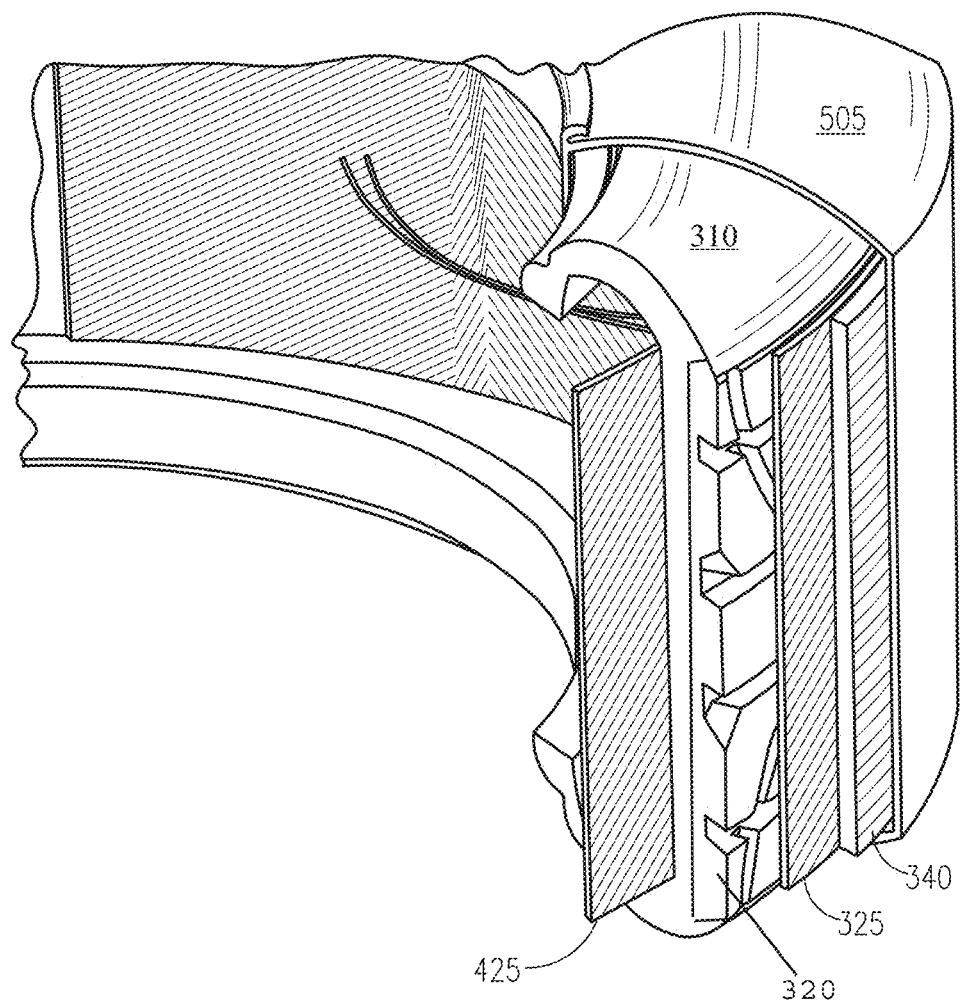
FIG. 4B is illustrates an example tire retread package adding an outer vacuum envelope and an interior heating pad element such as utilized in FIG. 2.

FIG. 4B illustrates an alternative embodiment of a tire curing package with a cutaway illustration showing the use of both an inner and an outer heating pad elements 425, 340 arranged with the retread package. If desired, the inner heating pad element may not be utilized for some retreading embodiments, or it may be provided on the outside of an outer envelope or protective layer 325, rather than against the retread 320 provided on the casing 310. In some embodiments, an outer vacuum envelope 505 is applied over the outer heating pad element 340 and protective layer 325. The protective layer 325 is provided to protect the heating pad 340 from damage from the treads of the retread 320, and it may be further adapted to prevent seepage of the adhesive, and may be omitted where not necessary, or where a protective layer is incorporated into the heating pad 340 (as described in more detail in other examples provided below). As previously noted, however, it is envisioned that some embodiments may have complimentary inner and outer vacuum envelopes or an outer vacuum envelope working in conjunction with an inner bladder, for example, as part of the curing package.

As can be seen in the FIG. 4B view, an inner heating pad element 425 is placed inside the casing (and may be held in place using an inner envelope, not shown) and an outer heating pad element 340 is placed on the inner envelope 325 which is provided on the exterior of the new tread layer 320. An insulation layer may be provided on the outer surface of the exterior heating pad element 325 or it may be incorporated into the retread envelope. The exterior envelope 505 may be operable to apply a force that compresses the various layers together during the curing process, such as through use of a nozzle and vacuum as for the example shown in FIG. 4A.

Notably, the disclosed exemplary embodiments of these resulting tire retread packages, and their equivalents, are not limited in applicability to any particular type, manufacturer or supplier of casings, Cushion gum (or other adhesive) layers or retread layers. A non-limiting list of Cushion gum types includes all Cushing gums, gum rubbers, glues, adhesives, or their equivalents, that may be supplied by any manufacturer for this purpose, such as, for example, provided by Meyers Tire Supply and/or Oliver Rubber. Further, a non-limiting list of retread layer types includes all retread layers, or their equivalents, that may be supplied by Michelin, Bridgestone/Firestone, Bandag, Goodyear and/or Marangoni.

Figure 5A:
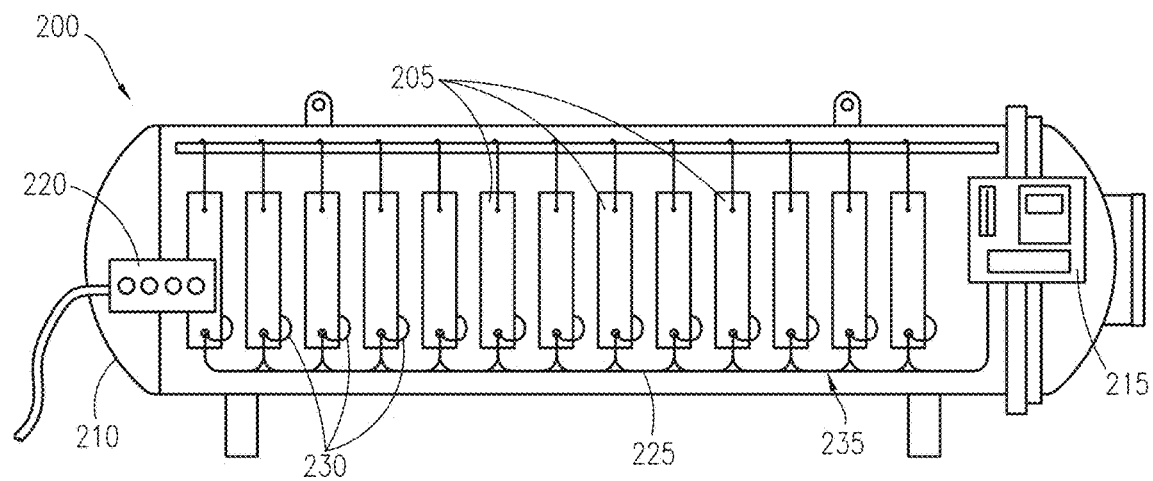
FIGS. 5A and 5B depicts a system and/or a method utilizing an autoclave for curing the tire retread package such as those disclosed in the above figures.
Figure 5B:
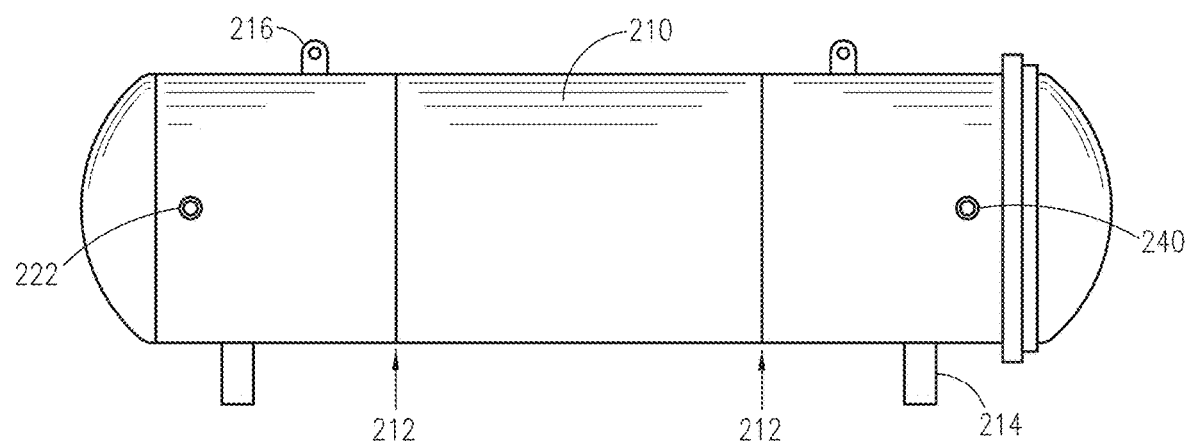

Figures. 5A and 5B depict an example curing system 200 according to one embodiment that leverages dedicated electric heating pad elements as described herein for targeted, individualized control of the curing process for each of one or more curing packages 205 through the use of an autoclave 210. This exemplary embodiment 200 comprises a curing chamber 210 (such as an autoclave, for example) a plurality of curing packages 205 (such as described herein, for example), a control system that may include a programmable logic controller 215 and a vacuum system 220. It is envisioned that the curing chamber 210 may be constructed of any material suitable for containing one or more curing packages 205, including, but not limited to, carbon steel, stainless steel, plastic, etc. This chamber 210 may be provided in parts such as with seams 212 for ease of assembly. One or more lifting lugs 216 can be provided to enabling lifting of the various parts, for example, and legs 214 used for supporting the chamber 210.

Each tire curing package 205 may be tethered to the control system 215 via a dedicated control and power link 225 that may include a temperature loop and/or a pressure loop and/or a power loop. Further, each tire curing package 205 may be tethered to the vacuum system 220 connected to a source of vacuum such as via nozzle 222, such that a vacuum may be applied to each tire curing package 205 via use of a nozzle provided in each one of the envelopes (described above), or the vacuum may be provided to the entire interior of the chamber 210 in which case the envelope nozzles act to connect the tire curing package to the interior vacuum. Other embodiments may replace the vacuum system with, or further include, a pressure system (not shown) in place of the vacuum system for providing a force to the interior of a tire retread package 205 via a bladder, or pressure might be applied to the envelope via nozzles. The pressure applied to each tire curing package 205 may be substantially 80 psi, although it is envisioned that other pressures above or below 80 psi may be applied in some embodiments. Heated air might also be provided in the chamber 210 by a heated air system via nozzle 240, for example, to supplement the heating provided by the heating pads, or a heated air system may be included within the chamber 210.

Advantageously, because each tire curing package 205 may be individually controlled via a dedicated control link 225, customized temperature and/or pressure inputs may be provided on a per curing package 205 basis. Further, because each tire curing package 205 is individually controlled and curing temperature provided internal to a given curing package 205, one of ordinary skill in the art will recognize that an air circulating system, such as system 125 in FIG. 1, may not be required for some embodiments.

An example process of retreading using system 200 involves placing the tire with casing, new tread, and cushion gum into an envelope to form the curing package and then putting the curing package into a curing chamber, such as an autoclave. The curing chamber applies heat and pressure which cures the tire, the cushion gum, and casing into a cured retread tire. The curing chamber applies pressure through use of a vacuum or pressure source, thus applying all around pressure to the tire and tread provided in the envelope. The heat can be applied in any combination of three different ways; One way of providing heat is to introduce heated air into the heating chamber, such as by using a hot air steam provided in a rear of the chamber and circulating the heated air, such as by using a fan. Alternatively, heated air in the heating chamber can be provided by placing one or more heating elements on a ceiling of the heating chamber and again using a fan to circulate the air around the autoclave. Both ways use the process of heating the air in the autoclave to create heat sink for the retread process.

The other ways to provide or supplement the heated air is by using an interior and/or an exterior electric heating pad elements within the tire curing package such as described above. This helps to achieve a quicker heat up time as well as save energy, and the use of one or both of these heating pad elements may preclude any need to utilize heated air in the heating chamber. The example process using just the heating pads for heating the curing package can avoid the use of a fan because the heat is being applied directly to the tire. The time of curing is lower due to the more efficient use of heat sink to the product with relation to time of curing temp reached. Further, as compared to the prior art, cooldown time after curing may be significantly shortened as there will be no need to cool the entire autoclave.

As described for some of the examples above, the tire casing, tread, and adhesive (such as cushion gum or gum rubber) is assembled within an envelope with the electrical wires for control and power to the heating pad elements being made accessible, such as by being pulled through a grommet provided in the envelope in a sealed manner to maintain the seal for vacuum on the tire within the envelope, and use of a connector for assembling the envelope for quick and ruggedness use. The tire is then placed in the curing chamber with pressure and heat being applied as described herein to cure the tires. This process can save on energy usage through use of the electrical heating pad elements band achieving a desired curing temp in approximately 10 minutes.

Generally, the curing package for an example embodiment using a curing chamber (autoclave) can be prepared as follows:

The retread package is prepped with its constituent components on a builder and is prepared in the curing package by placing the inner heat pad element within the tire casing. Then the inner envelop is place in and around the inner casing over the inner heating pad.

Then the retread envelop is placed around the outside tread of the retread package. This retread envelope is used for preventing the Cushion gum from pushing/being pulled up through the tire lugs as a vacuum is pulled on both the inner and retread envelope once a seal is achieved. This process is called Cushion migration and happens once the inside of the tire heats to about 190 F.

Once a seal is achieved and this package is vacuumed down the outer heating pad element is placed around the package. An outer envelope is then placed over the outer heat pad element for the purpose of starving the heat from oxygen to prevent fire and also prevent heat loss.

Once this process is complete, the resulting curing package is placed in the autoclave/chamber to apply external pressure around the tire. In some situations it may be desirable to use only a vacuum to provide sufficient pressure, and hence avoid the external pressure.

Figure 6:
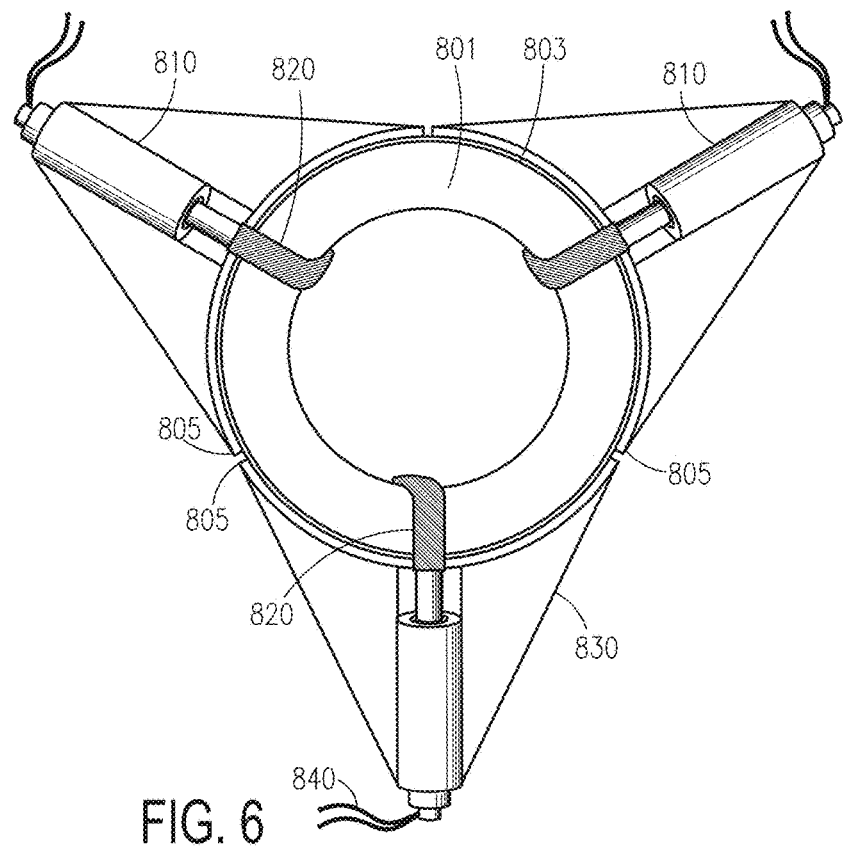
FIG. 6 illustrates an alternative system and/or method utilizing a pneumatic or hydraulic subsystem used for curing the tire retread package.

FIG. 6 depicts another example curing system 800 according to another embodiment that utilizes hydraulic or pneumatic systems to provide pressure to the tire tread during the curing process and avoids the use of a curing chamber, allowing tires to be economically retread in any numbers. In this example, a tire retread package 803 with tire assembly 801 is provided with one or more envelope portions 805 provided around the retread package. Each one of the envelope portions 805 has a rigid plate that is attached or otherwise connected via handle clamp 820 to one or more pneumatic or hydraulic cylinders 810 powered by a fluid line 840. The handle clamps 820 have a portion that is provided underneath the girth of the tire and attaches to the other side using a screw or lock device to completely encircle that portion of the tire. A brace 830 can be used to hold the entire curing package together. By activating the cylinders 810 to extend a piston and move the rigid plates, the handle clamps 820 put pressure on the envelope portions 805. Alternatively, the pistons of the cylinders 810 could be directly connected (or merely provided in contact with) to the envelope portions 805. Using an example tire assembly such as shown in FIG. 2 or 3 above, for example, the cylinders will push the rigid plates into the tire tread and into the tire casing during curing to ensure that a good bond forms.

For example, the clamps 820 can be provided surrounding the tire and divided into 3 separate sectional units of envelope portions 805. On the inside of the clamp is provided a high temp rubber to protect the metal. The sectional unit clamp is held on to the tire by a handle that comes underneath and screws to the other side. On the top of the sectional unit rim clamp is a hydraulic or air cylinder 810. These cylinders are used to apply a force to the tire.

Hence, heat can be applied by using an interior heating pad element, an external heating pad element, or both. The heating pad elements may be held in place in any manner described herein or in an alternative manner. As described above, the heating pad elements will have data and power cables. Power will be provided by an external power supply, and the data cables will connect to a system controller to monitor and control the curing process.

Pressure is applied using the multi-part envelope via the cylinders using hydraulic or air pressure. For example, as shown, three envelope portions can be utilized or alternatively two, four or five portions could be used. Pressure is thus applied, for example, by using a cylinder and handle clamps with the envelope portions that surround the tire, and then heating can take place to cure the tire.

Alternative means of applying external pressure can utilize a mold, or a band in tension that can be provided around the tire. For example, a band connected by tension springs could alternatively provide pressure to the tread. For example, a pressure clamp surrounding the tire with a screw design can be provided on both sides of tire. The inside of the clamp that touches the tire is covered with high temp rubber to protect the metal from conducting the heat. Pressure is then applied by screwing the two sides together and squeezing the tire in between. Or envelope portions can be provided that screw together or can be otherwise connected together to provide substantially equal pressure surrounds the tire. Once the clamps are tightly in place and pressure is achieved, then the heating pad elements are activated and heat transfer begins.

Figure 7:
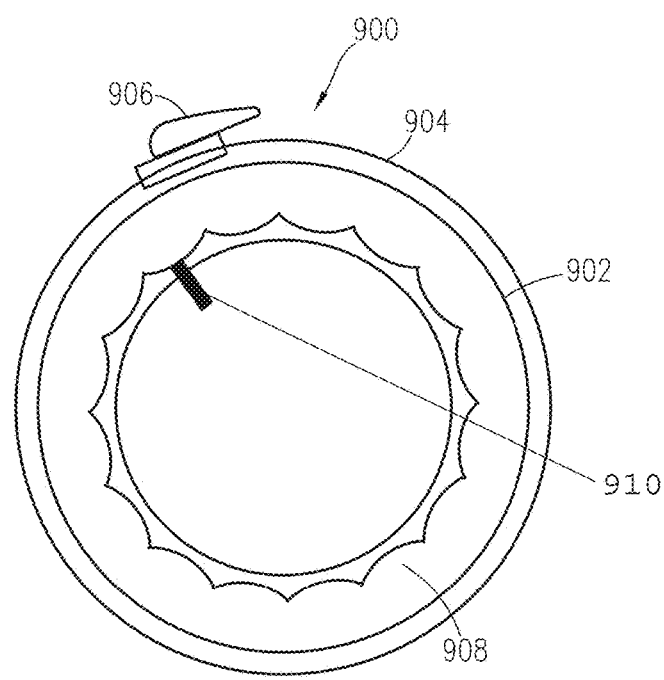
FIG. 7 illustrates another alternative system and/or method utilizing an inner tube bladder subsystem used for curing the tire retread package.

FIG. 7 depicts another example curing system 900 according to another embodiment that utilizes an inner tube (bladder) 908 for providing pressure. Note that although this tube/bladder is shown in an interior of the casing, an alternative design could provide a tube or bladder that surrounds the outer surface of the retread to push the retread into the casing. An outer envelope 904 is provided with connector clamp 906 to hold the retread package 902 together, and the bladder 908 (shown inside the tire casing) applies outward pressure on the tire casing to force the casing into the retread and then into the outer envelope 904. Again, as described above, heat can be applied by using an interior heating pad element, an external heating pad element, or both.

Pressure is applied by supplying the bladder 908 with air under pressure via nozzle valve 910 to inflate the bladder and thereby push on the inside wall of the tire casing applying force against the outer envelope 904 provided on the outside of the tire. Heat is provided by the heating pad elements (not shown) in a manner as described herein, with the process being controlled by a control system as described herein. Other curing systems can also use various combinations of the features and methods described above, among others.

The interior (inner) and exterior (outer) heating pad elements, as described herein, can be comprised of silicon bands or a flexible fiberglass or cloth with electric heating elements. The overlap of the bands can be protected with cloth insulation, for example. Furthermore, remote control of the curing process allows monitoring of the temperatures and status of the curing process. By using a controller to control the application of power (and hence control temperature) of the heating pads the process can be controlled and timed to allow for the proper curing of the retread package. This control can be automated using a computer or controller (e.g., a PLC), for example, or might be manually controlled by an operator monitoring the timing and temperatures.

FIG. 9 is a line drawing of an exemplary heating pad element 700 according to one embodiment of the present invention, such as may be used for any of the examples described herein. This exemplary heating pad element 700 may be an interior or an exterior heating pad element as was described relative to the previous figures. The FIG. 9 heating pad embodiment may comprise heating element(s) 705 of resistive conductors operable to generate thermal energy when a voltage is applied via leads 335. A temperature sensors 330, 430 may be leveraged to generate a data signal that correlates to the temperature of the heating pad element 700 such that voltage and/or amperage provided to the heating pad element 700 may be varied in order to vary the amount of thermal energy generated. The heating pad is flexible so that it can be wrapped around a retread package, and has a width sufficient to cover most of the retread outer surface, which may include the sides of the retread to ensure proper heating. In this way, one of ordinary skill in the art will recognize that the thermal energy may be varied in order to accommodate various cure temperatures, cycle times, ramp times, soak times and the like required for various retread tire packages.

Further, the heating pad element 700 may comprise an insulation layer 340, as describe above relative to previous figures. Moreover, heating pad element 700 may comprise fastener components 710 for securing the element 700 in a given curing package. Also, it is envisioned that preferably, heating pad elements should be flexible, but for some embodiments they can be made substantially rigid and, as such, the particular materials of construction or design of the heating pad element used in any given embodiment of the invention will not limit the scope of the disclosure. It is further envisioned that the specific performance specifications of heating pad elements may vary according to application and, as such, any specific heating pad design or specification will not be construed to limit the scope of the disclosure. Suitable voltage and amperage ranges for heating pad elements will occur to those of ordinary skill in the art of tire retreading or rubber molding. For exemplary purposes only, a non-limiting listing of various heater pad designs, including rigid and flexible designs, having myriad voltage/amperage/materials of construction combinations is appended to the present disclosure.

FIG. 9A shows the heating pad 700 with an additional layer 750 to make the heating pad more durable, to protect the heating pad from damage from the treads of the retread, for those heating pads put into contact with those treads. This layer 750 may be comprised of a strong cloth or plastic, or preferably of a strongly heat transmissive material such as aluminum or an aluminum alloy. By keeping the layer 750 thin, the heating pad may be made flexible, yet durable. Typically, this layer 750 would be placed on the opposite side of the insulating layer 340 (if present), and would typically be made integral with the heating pad 700 as a laminated layer, but could be made severable from the heating pad 700 to more easily replace this layer.

Advantageously, power requirements for heating pad elements 700 can be minimized and heat-up time of the retread process optimized by applying heat directly to the retread tire package using such a heating pad element 700 as an interior and/or exterior heating pad element in the manner described above. Current systems and methods known in the art may require a relatively high current draw of 480V, 3-phase power be supplied to the single, large heating element tasked with heating the tire retread packages along with the entire curing chamber. By contrast, certain embodiments can be provided to utilize 240V, single phase power in relatively lower current levels be supplied to the individual tire retread packages being cured. As such, one of ordinary skill in the art will recognize that embodiments of the present invention may consume less aggregate energy for a given cycle than current systems and methods known in the art. Further, with heating pad elements, one of ordinary skill in the art will recognize that distributed wattages or multiple heater circuit designs are possible with heating elements.

For any of the above described embodiments, to achieve a quicker heat up time heating pad elements can be placed on both the outside circumference of the tire (i.e., an exterior heating pad element) and the inside wall of the tire (i.e., an interior heating pad element). Any overlap of the heating pad elements (such as those provided as a strip or band) can be protected using cloth insulation. The heating pad elements can be arranged as bands made of silicone but can also be made out of fiberglass or other materials. This is to allow one band to be made sufficiently long fit many different sizes of tires and allow multiple uses. Once both heat bands are securely in place the tire components are formed into a package to be pressurized as described herein. The use of the heat band in the wall of the tire and on the top of the tire allows for the tire to begin heat sink quicker and heat is emanated from both sides to cure the adhesive between the casing and the retread layers.

Figure 8A:
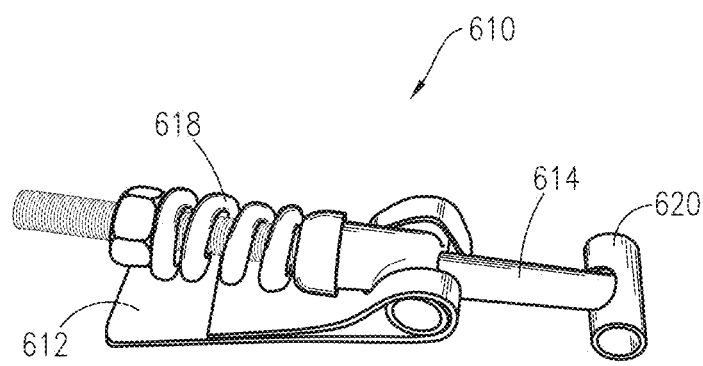
FIGS. 8A-8C depict an exemplary fastener comprised within various embodiments of heating pad elements according to at least one embodiment.
Figure 8B:
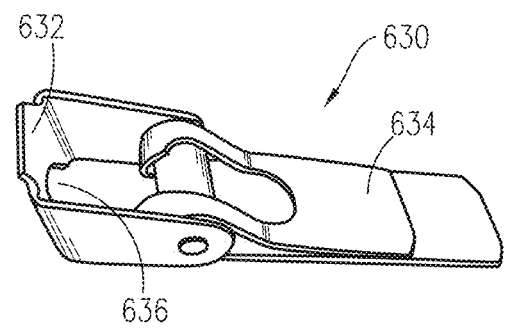
Figure 8C:
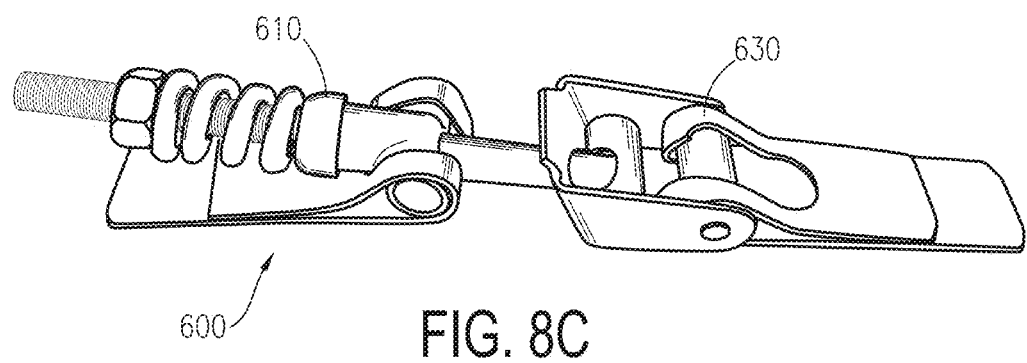

FIGS. 8A-8D depict an exemplary fastening aspect comprised within various embodiments of heating pad elements and/or envelopes according to various embodiments described herein. One of ordinary skill in the art will recognize the functionality of the exemplary fastening components depicted in FIGS. 8A-8C. Provided is a first connector part 610 comprising a spring 618, a base 612 to attach to an end of a corresponding envelop or heating pad element, a shaft 614 connected to a first connector end 620. Also provided is a second connector part 630 having a base 634 for attaching to another end of the envelop or heating pad element, and a second connector end 634 with a slot 636. The first and second connector parts 610, 630 are shown in a connected state 600 in FIG. 8C. Notably, the fastening component depicted in FIGS. 8A-8C is offered for exemplary purposes only and will not limit the scope of fastening means that may be comprised in any given embodiment of the invention.

As an alternative application, the heating pads can be provided as part of the envelope so that the envelopes are manufactured with an integrated heat pad, which may include overlap potions as described below. The may improve the efficiency of preparing the retread packages since the separate step of applying the heating pads may be avoided.

Figure 10:
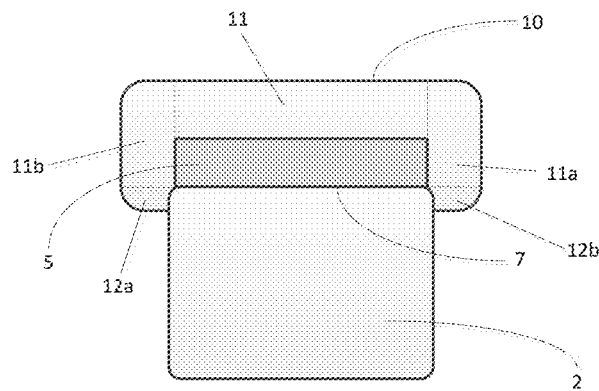
FIG. 10 illustrates an alternative embodiment of an example heating pad with overlap design.

FIG. 10 illustrates a cross section of a portion of a tire undergoing a retread curing operation. A layer of adhesive 7 is placed between the retread layer 5 and the tire casing 2. An alternative embodiment of a heating pad 10 (likely shown exaggerated in thickness for illustrative purposes) is placed over the retread layer 5 such that overlap portions 11a and 11b of the heating pad 10 overlap opposite sides of the retread layer 5 whereas portion 11 covers the outer surface of the retread to ensure sufficient heat is transmitted to the retread layer 5 to ensure a uniform and complete cure edge-to-edge and, where desired, to prevent the adhesive from extruding from out of the sides where the retread layer 5 contacts the tire casing 2. The heating pad 10 may also extend over the tire casing 2 at endpoints 12a, 12b to ensure adequate heat flow into the retread layer 5, but it may be desirable to minimize or eliminate these endpoints to avoid damaging the tire casing 2 from overheating. As described above regarding other embodiments of heating pads, another heating pad may be provided inside the tire casing 2 to provide additional heat to ensure a quick and adequate cure.

Figure 11:
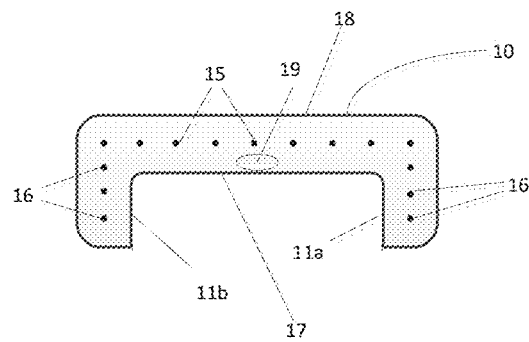
FIG. 11 illustrates the alternative embodiment of the heating pad used in the process of FIG. 10.

FIG. 11 shows a cross section of an example heating pad 10 showing overlap portions 11a, 11b, and a plurality of heating filaments 15, 16 for electrically generating heat similar to as discussed for the embodiment of FIG. 9. Note that filaments 16 are provided in the overlap portions 11a, and 11b to heat the sides of the retread during the curing operation. In order to adjust the heat distribution, the filaments 16 may be provided at a different density than the filaments 15, so that the overlap portions may generate more, or less, heat, as desired, to ensure an adequate cure. Furthermore, the overlap portions 11a, 11b, may be designed to "grip" the edge of the tire undergoing the retread operation, such as through the use of an elastic band, and/or an inward curve to better grip the tire and hold the heating band 10 in place. The heating pad will likely be made flexible to enable ease of placement around the tire to set up the curing process, and it may be made of different lengths depending on the size of the tire being retreaded. An insulating layer may be provided between the portions of the heating pad that overlap to protect the heating pad from heat damage.

The heating pad 10 may be coated with an inner layer 17 and/or an outer layer 18 to strengthen the heating pad and/or provide a more uniform heat distribution. The inner layer 17 can be made particularly strong and stiff to prevent the treads on the outer portion of the retread layer 5 from damaging the heating pad to allow for continued reuse of the heating pad for multiple tire cures. Either of these layers could be of a metal, such as aluminum, for example, which can aid in heat distribution across the retread, especially where an inner layer 17 is so provided. Strong polymers, in particular those that are efficient in transferring heat could be used. Such layers could be provided as a sheet of material, for example, or as a coating which may include a metallic powder that is painted or otherwise bonded to the surface of the heating pad.

One or more thermocouples 19 or other temperature sensors may be provided on an inside, or an inner surface, of the heating pad 10 to collect temperature data from the heating pad 10 during the curing process for use in monitoring and/or controlling the curing process.

In some situations, the heating pad may overlap at its ends when wrapped around a tire undergoing retread, or multiple layers may be provided in order to provide more heat generation to ensure a faster and more effective cure, where desired.

Figure 10A:
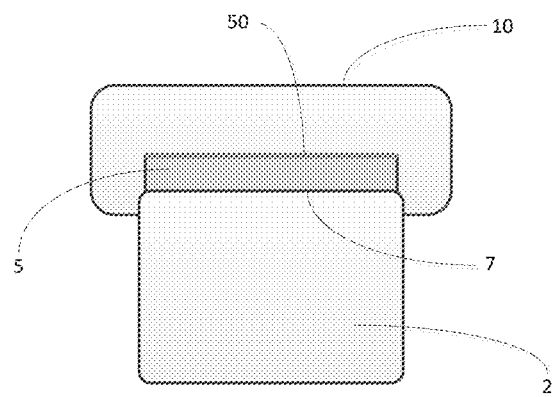
FIG. 10A shows an alternative embodiment of the example heating pad of FIG. 10.

Alternatively, as shown in FIG. 10a, a protective layer 50 can be provided between the retread 5 and the heating pad 10 to protect the heating pad 10 from the treads of the retread layer to allow for repeated reuse of the heating pad 10. The protective layer 50 might be a sheet of strong, heat transmissive material, such as an aluminum sheet, for example, or a strong polymer or composite material. This layer may replace the protective inner layer 17 shown in FIG. 11, or it may supplement it for added strength and durability to prevent damage from the retread treads and allow a longer lifetime of reuse. This inner layer may be provided as a separate, removable layer, or made integral with the heating pad. Rather than being placed in the heating pad, the thermocouple may be placed within the protective layer, for example, or even within the retread 5, if desired.

Figure 12B:
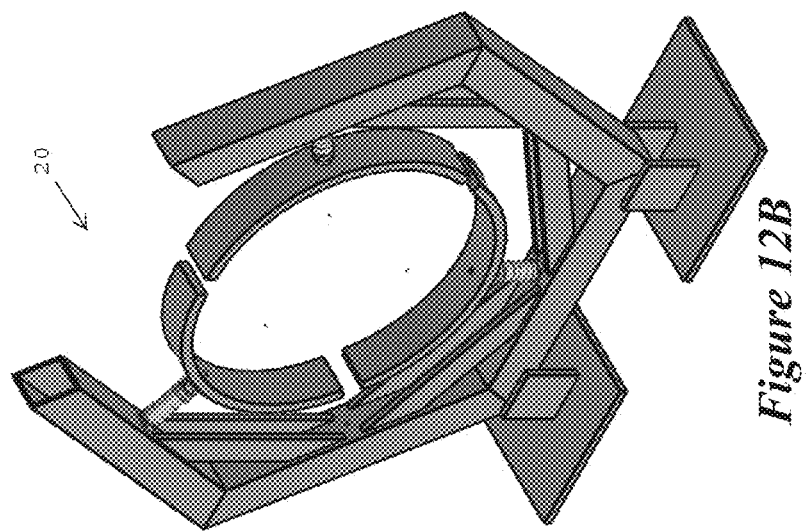
FIGS. 12a and 12b illustrate an alternative device for providing pressure on the retread package during curing.
Figure 12A:
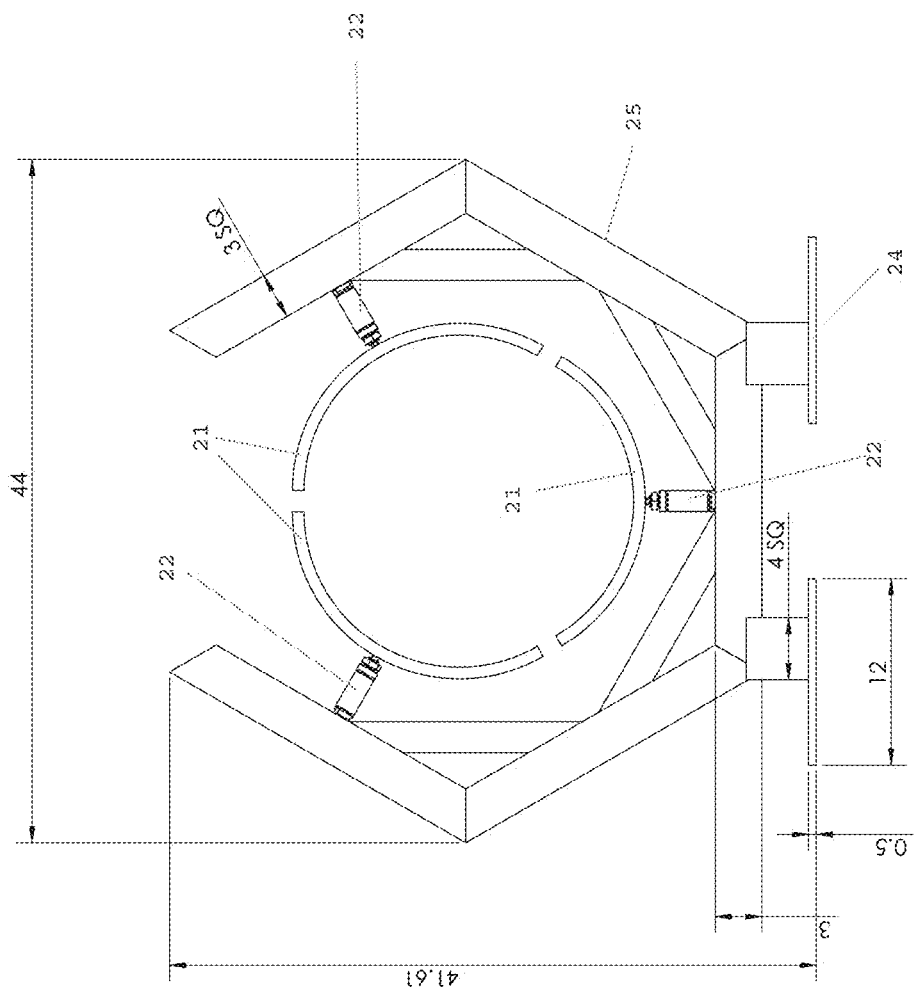

FIGS. 12A, 12B, show an alternative device that can be used to provide pressure on the tire package undergoing a retread operation. The device 20 has a plurality of rigid pressure plates 21 that are placed into contact with the retread on the tire package to provide an inward force on the retread to force the retread into the tire casing. Note that if desired, similar plates or another device could be provided on an interior of the tire casing to provide a force in the opposite direction (i.e., outward). Existing lock rings might be used for such a purpose. Actuators 22 are provided to provide the desired force to the pressure plates 21. The actuators 22 may be pneumatic, hydraulic, or electric devices to provide the desired force. A frame 25 is provided on a base 24 to hold the parts together in a sufficiently strong manner to provide the desired forces on the retread. The device 20 may be made adjustable to adapt to different tire sizes, or the device may be provided in different sizes to accommodate the different tire sizes. Note that although 3 pressure plates 21 are shown with discrete separations between them, any number of plates might be provided, and in some cases the plates may even overlap to accommodate different tire sizes. It is desirable that the gaps between the plates be minimized in most situations to ensure that most, if not all, of the retread is in contact with a plate to ensure even and uniform distribution of pressure to aid in a uniform and strong bonding during the cure.

Figure 13:
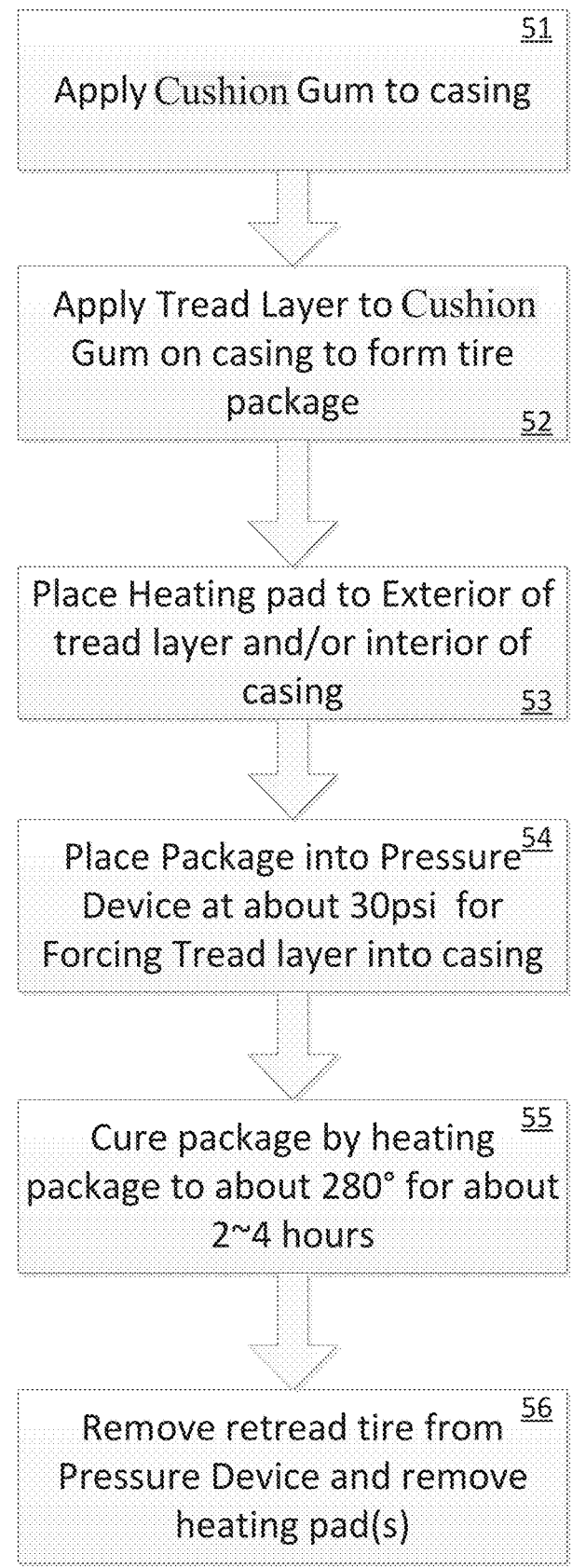
FIG. 13 illustrates an alternative example method of performing a retread process.

FIG. 13 is a flow chart showing a process of using the device of FIG. 12. A casing is provided with a layer of cushion gum (adhesive) 51, and then the tread layer is provided around the casing on the layer of cushion gum 52 to form a retread tire package. A heating pad, such as discussed above regarding FIG. 10 is provided around the retread 53, and another heating pad may be provided within the tire casing as well to ensure adequate heat is provided during the cure. The tire package is placed into a pressure device such as shown in FIG. 12, and pressure is applied to the retread layer 54, such as around 30 psi, for example, to force the retread into the casing. Note that if a counter force from within the casing is desired, another device, such as a lock ring, might be placed within the casing. The heating pads are then heated to raise the retread to about 280° for about 3 hours or so to cure the retreaded tire. The heat is then removed from the tire and after sufficient cooling, the tire is removed from the pressure device and the heating pad(s) removed 56 to release the retreaded tire.

Figure 14:
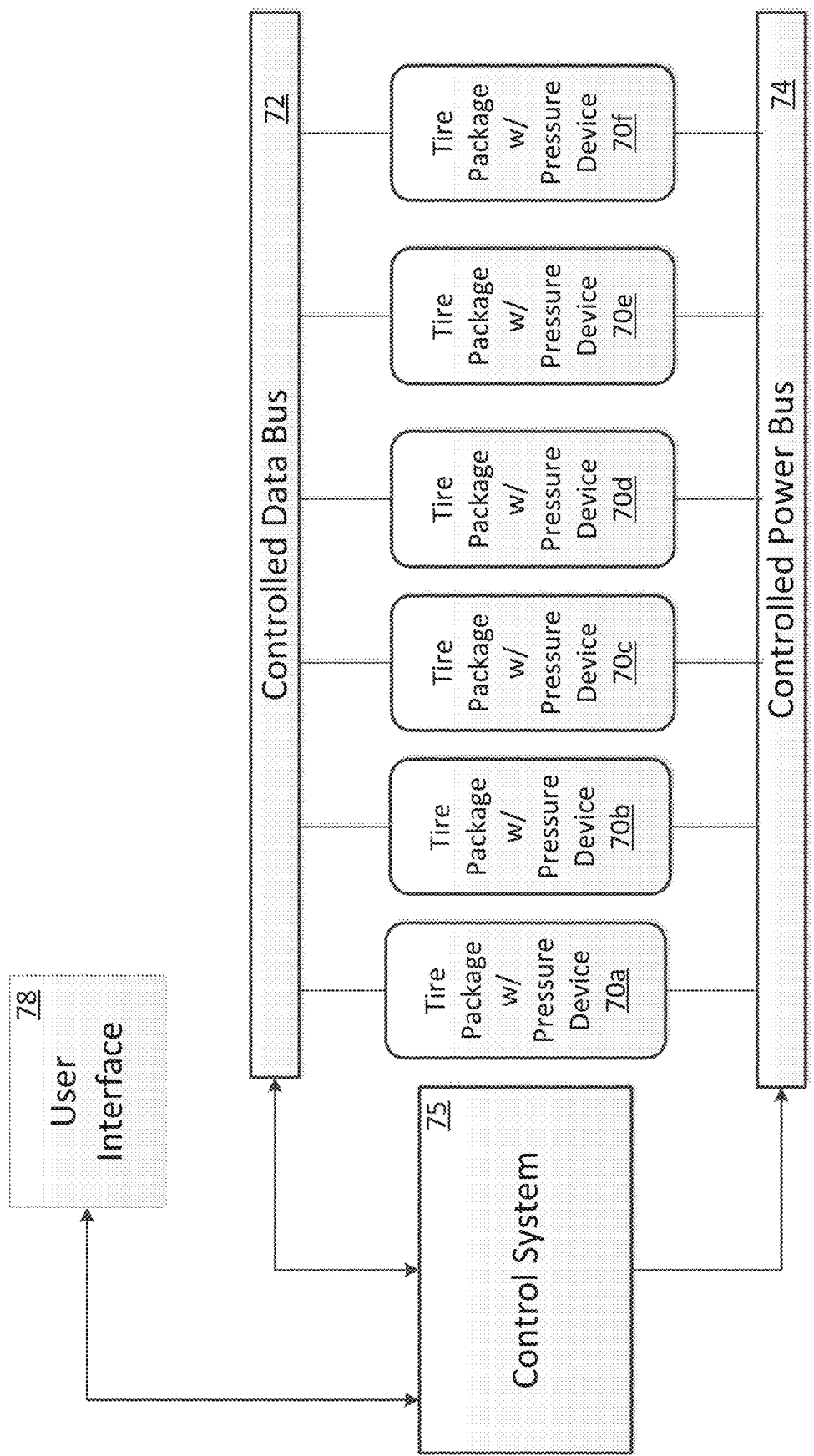
FIG. 14 illustrates an example system for performing retread operations.

FIG. 14 shows a system that can be used to implement a method such as that described above. The system has a plurality of tire packages installed in individual pressure devices 70a-70f that are each connected to a power bus 74 to provide power to the heating pads of the respective packages. Furthermore, each of the packages 70a-70f is connected to a data bus 72, which collects data from the packages 70a-70f. The collected data will typically be temperature data that is provided by one or more thermocouples that are provided either in the respective heating pads, or that may be provided elsewhere in the packages to monitor the curing temperature. The system is controlled by a control system 75, that may have a user interface 78 which may include a display or indicators for monitoring the test temperatures, status, duration, etc. and a keyboard or other input device for inputting commands and controls into the control system 75. Note that because each of the packages 70a-70f are independently arranged, retread packages may be added or removed at random without interrupting the curing processes of other tires, leading to a very flexible setup.

Figure 15:
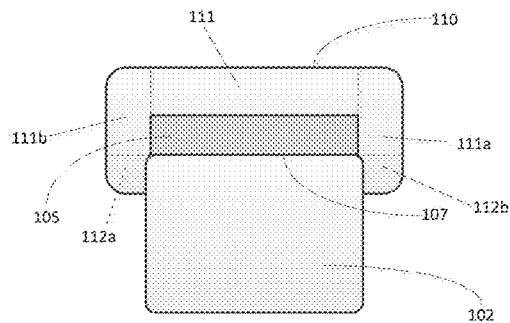
FIGS. 15-17 illustrate another example system for performing retread operations.

FIG. 15 illustrates a cross section of a portion of a tire undergoing a retread curing operation using a different embodiment. A layer of adhesive 107 is placed between the retread layer 105 and the tire casing 102. An envelope 110 incorporating heating elements is placed over the retread layer 105 such that overlap portions 111a and 111b of the envelope 110 overlap opposite sides of the retread layer 105, whereas portion 111 covers the outer surface of the retread to ensure sufficient heat is transmitted to the retread layer 105 to ensure a uniform and complete cure edge-to-edge. The envelope 110 may also extend over the tire casing 102 at endpoints 112a, 112b to ensure adequate heat flow into the retread layer 105, and to prevent adhesive from extruding from out of the sides where the retread layer 105 contacts the tire casing 102. In the case of using an envelope with the package, the portions 111a and 111b may be extended over and around all, or a large portion of tire and casing, such as sufficient to allow a vacuum seal be applied to compress the retread into the core, as described in some embodiments discussed above regarding FIG. 4A, for example. As described above regarding other embodiments, a heating pad may be provided inside the tire casing 102 to provide additional heat to ensure a quick and adequate cure.

Figure 16:
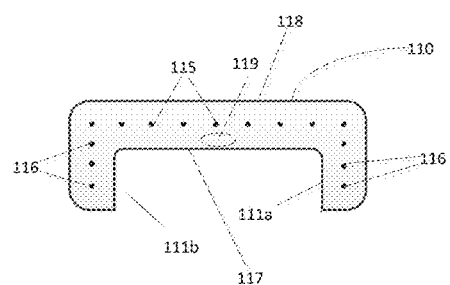

FIG. 16 shows a cross section of the envelope or plate 110 showing overlap portions 111a, 111b, and a plurality of heating filaments 115, 116 for electrically generating heat. Note that filaments 116 can be provided in the overlap portions 111a, and 111b as shown to better heat the sides of the retread during the curing operation. In order to adjust the heat distribution, the filaments 116 may be provided at a different density than the filaments 115, so that the overlap portions may generate more, or less, heat, as desired, to ensure an adequate cure. One or more thermocouples 119 may be provided on an inside, or an inner surface, of the envelope 110 to collect temperature data from the assembly during the curing process for use in monitoring and/or controlling the curing process.

Figure 15A:
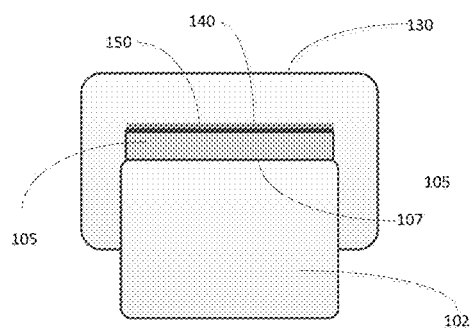

Alternatively, as shown in FIG. 15a, a separate heating pad 140 such as described for the embodiment 4B might be used, with an envelope/plate 130 merely providing structural support for the process. Envelope/plate 130 is shown covering much of the core 102 in this embodiment. The heating pad 140 could be provided outside of the envelop, or inside the envelope as shown, but with a protective band 150 being provided between the retread treads and the heating pad 140 to protect the heating pad from damage from the treads. The protective band 150 could be an aluminum sheet, for example. The Envelope/plate 130 may be rigid to support the force application of embodiments such as shown in FIGS. 6, 12A/12B, 24, or 27, among others.

Figure 15B:
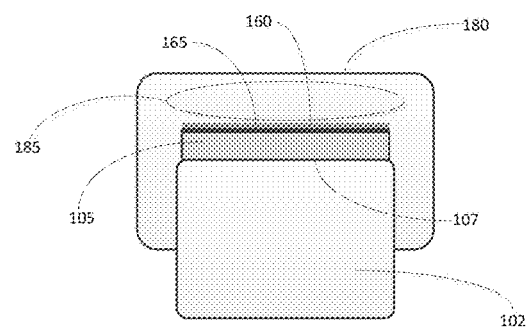

In an alternative embodiment shown in FIG. 15b, a flexible and expandable envelope 180 can be adapted to include an inflatable bladder or void 185 that inflates to impose an inward force to push the heating pad 160 into the retread 165 which is also forced into the core 102.

Figure 17:
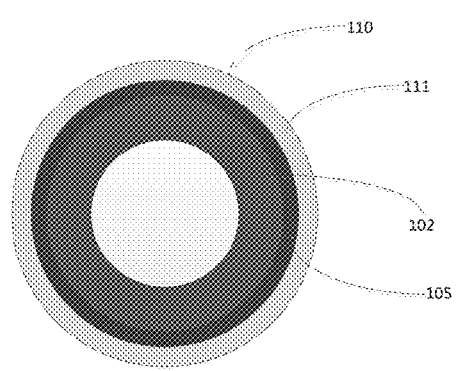

FIG. 17 shows a radial cross section of the assembly with the components described above installed on the tire. Of course, in the actual package, the envelope 110 will cover most or all of the sides of the tire to allow for a vacuum or pressure to be applied, for example.

Figure 18:
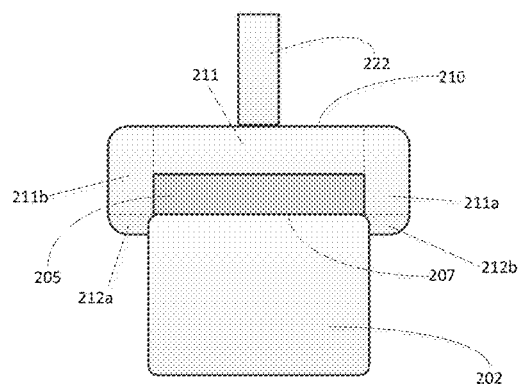
FIGS. 18-20 illustrate still another example system for performing retread operations.
Figure 24:
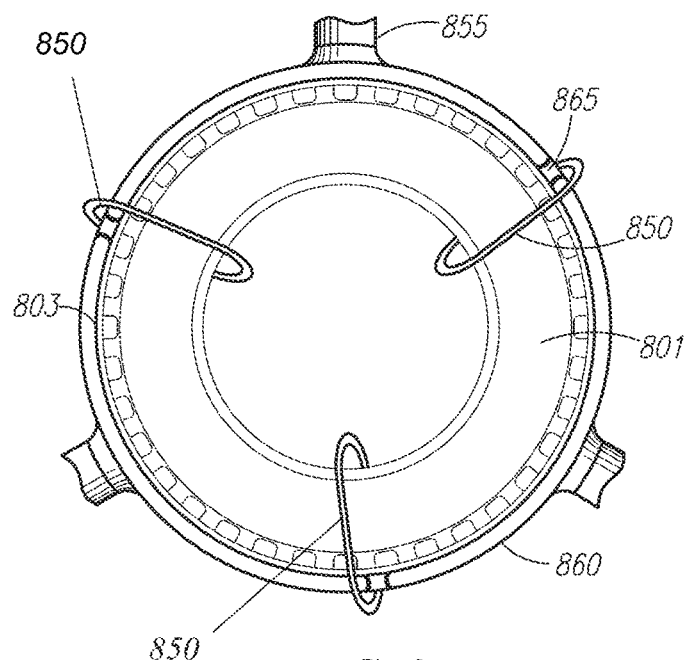
FIG. 24 shows another example embodiment of a clamping/pressure system.

FIG. 18 illustrates a cross section of a portion of a tire undergoing a retread curing operation using an alternative embodiment using a device similar to that shown in FIGS. 12A, 12B or FIG. 24. A layer of adhesive 207 is placed between the retread layer 205 and the tire casing 202. A pressure plate 210 incorporating heating elements is placed over the retread layer 205 such that overlap portions 211a and 211b of the plate 210 overlap opposite sides of the retread layer 205 whereas portion 211 covers the outer surface of the retread to ensure sufficient heat is transmitted to the retread layer 205 to ensure a uniform and complete cure edge-to-edge. The pressure plate 210 may also extend over a portion of tire casing 202 at endpoints 212a, 212b, if desired, to ensure adequate heat flow into the retread layer 205, and to prevent the adhesive from extruding from out of the sides where the retread layer 205 contacts the tire casing 202. A piston 222 is provided to apply a pressure/force (i.e., "push") the plate 210 to push the retread 205 into the tire casing 202. As described above regarding other embodiments, a heating pad may be provided inside the tire casing 202 to provide additional heat to ensure a quick and adequate cure.

Figure 19:
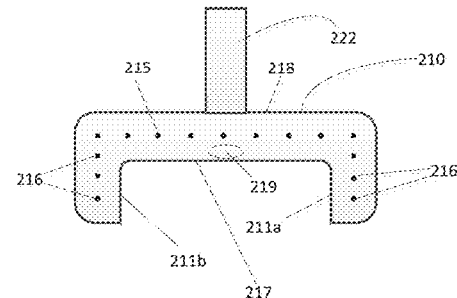

FIG. 19 shows a cross section of the plate 210 showing overlap portions 211a, 211b, and a plurality of heating filaments 215, 216 for electrically generating heat. Note that filaments 216 can be provided in the overlap portions 211a, and 211b as shown to better heat the sides of the retread during the curing operation. In order to adjust the heat distribution, the filaments 216 may be provided at a different density than the filaments 215, so that the overlap portions may generate more, or less, heat, as desired, to ensure an adequate cure. One or more thermocouples 219 may be provided on an inside, or an inner surface, of the plate 210 to collect temperature data from the assembly during the curing process for use in monitoring and/or controlling the curing process.

Figure 18A:
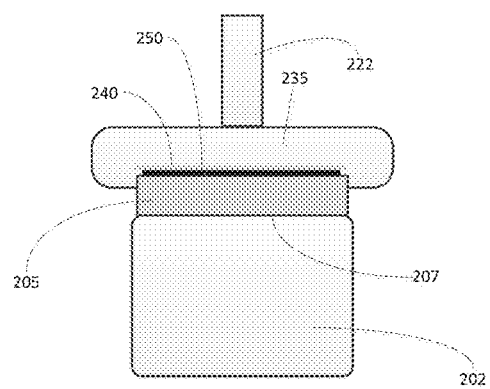

Alternatively, as shown in FIG. 18a, a separate heating pad 140 such as described for the embodiment of FIG. 4B might be used, with a plate 235 merely providing structural support and pressure for the process. Plate 235 is shown much shallower in this embodiment, and in alternative embodiments the plate may be flat with no overlap on the sides of the retread 205. The heating pad 240 could be provided outside of the envelop, or inside the envelope as shown, but with a protective band 250 being provided between the retread treads and the heating pad to protect the heating pad from damage from the treads. The protective band 150 could be an aluminum sheet, for example.

Figure 20:
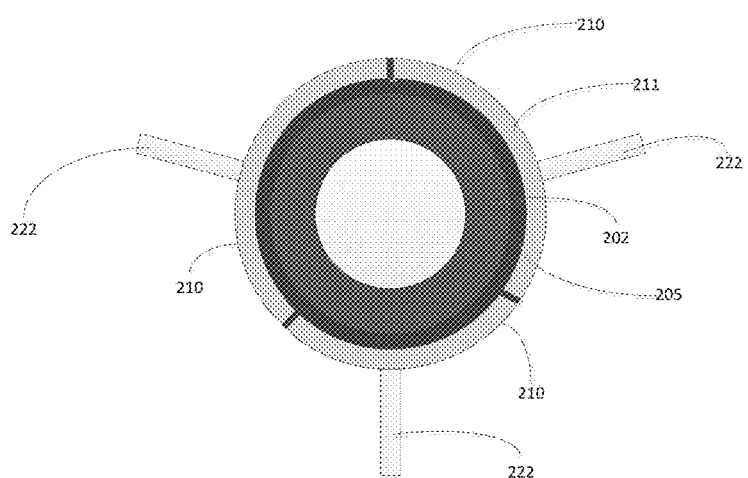

FIG. 20 shows a radial cross section of the assembly with the components described above installed on the tire. Of course, in the actual package, the plate 210 may cover part or all of the retread 205 of the tire to allow better heat transfer into the retread, and to prevent leakage of the adhesive, for example. The plates 210 can be comprised of any of the alternatives shown in FIG. 19, 18a, or 19 (or FIG. 15, 15a, 15b, or 16), and can be comprised of a metal, strong plastic, or other rigid and durable material.

Figure 23:
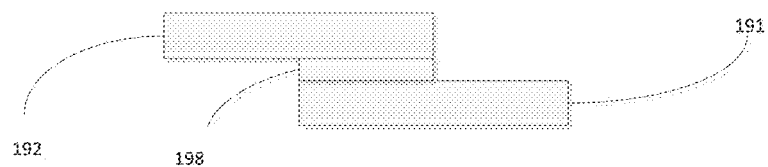
FIG. 23 shows an example overlap structure of an example heating pad.

FIG. 23 shows an example of ends 192, 191 of a heating pad being overlapped to adjust for the tire size, with an insulating cloth 198 being provided between the overlap portions in order to protect the heating pad from overheating. This cloth could be made of a cotton or fiberglass material, for example, or another appropriate insulating material.

Figure 21:
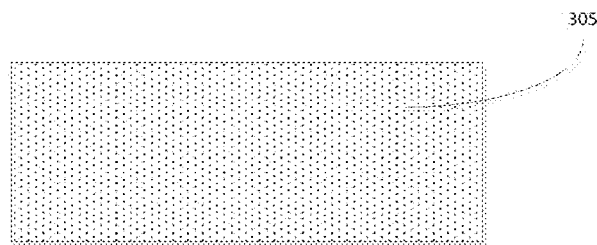
FIGS. 21-22 illustrate still another example system for performing retread operations.

As a final example, the retread layer may itself be manufactured with material incorporated with the retread that can be heated by bombardment of electromagnetic radiation, for example. For example, a metal powder of a metal that interacts with electromagnetic radiation (such as microwaves), such as iron or steel powder, could be incorporated into the retread 305 shown in FIG. 21, either uniformly distributed in the rubber material, or as one or more layers. Then, the retread could be mounted on a devices such as shown in FIG. 12A, 12B, but made of a non-metallic or otherwise non-radiation interactive material, and then the entire device could be bombarded with radiation, such as microwaves, to heat the retread and lead to a cure.

Figure 22:
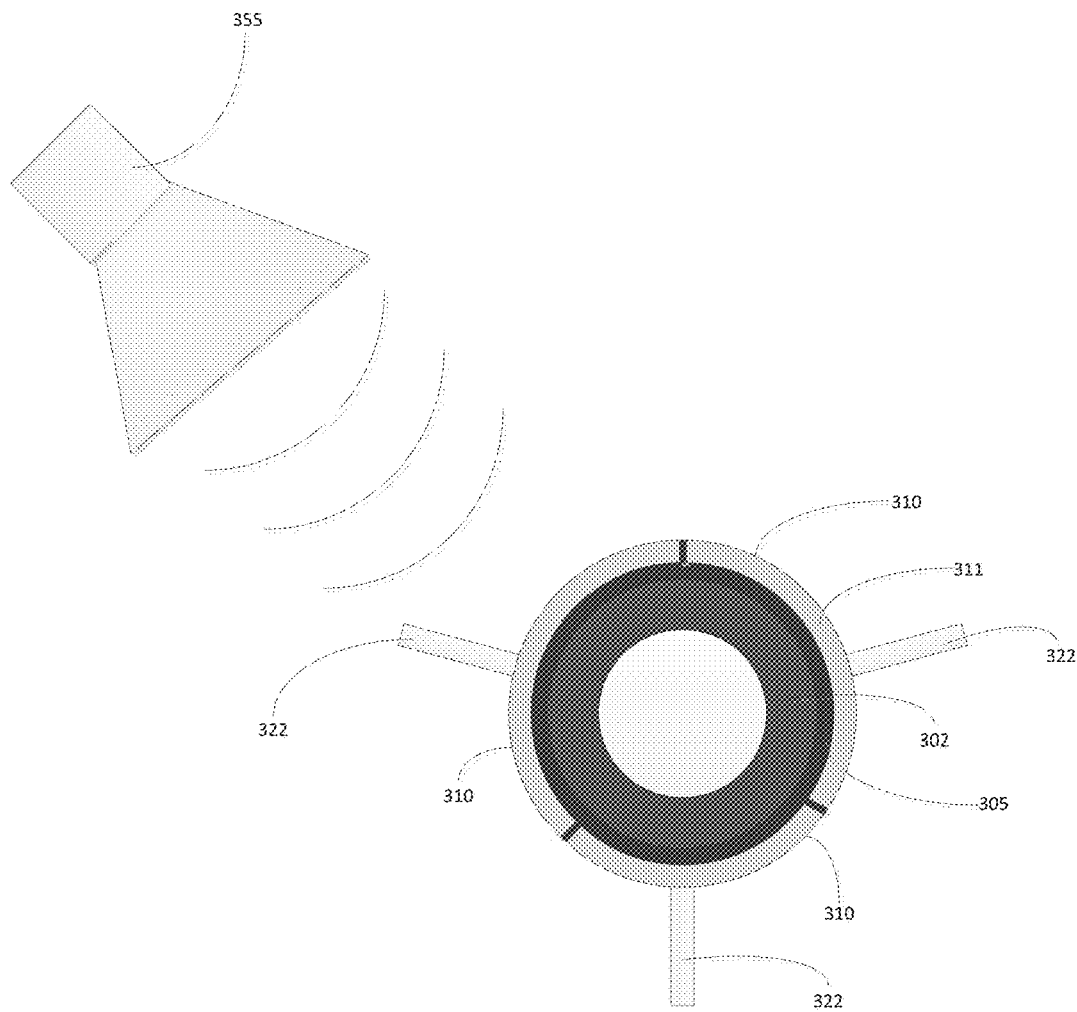

FIG. 22 shows a radiation emitting device 355 and a radial cross section the package setup, with pistons 322 and plates 310, preferably made of a radiation-proof material such as a composite or strong plastic material, for providing pressure on the retread package having tire core 302 and retread 305. The package is heated by the radiation emitted by the device 355 interacting with the composition of the retread 305. One or more thermocouples might be embedded into the plates 310, for example, to monitor temperatures during the cure. Note that as an alternative, an package approach could be used for this approach where the envelope is made of a radiation-proof material, in which case a vacuum system or pressurized air may be used instead as described above of mechanical pressure.

Figure 25:
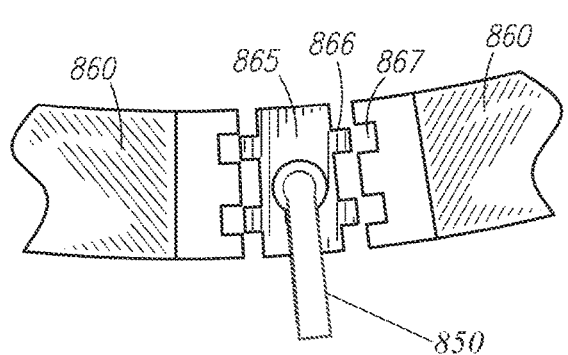
FIG. 25 shows an example for use in the example system of claim 24.
Figure 26:
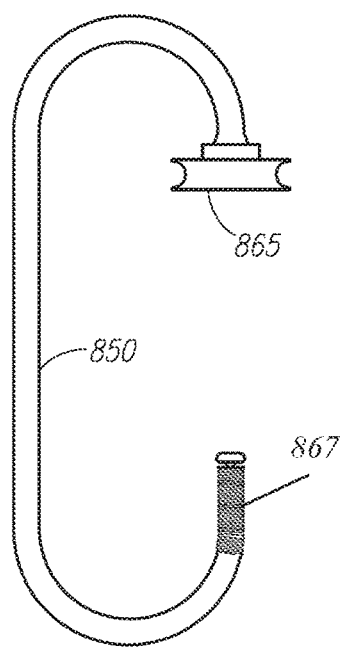
FIG. 26 shows an example adjustable fitting for use in the example system of claim 24.

FIGS. 24 to 26 depict another example curing system that is a modification of the system of FIG. 6 or FIGS. 12a, 12b, or FIG. 20 that can utilize electric, hydraulic or pneumatic piston cylinders 855 to extend plates 860 to provide pressure to the tire tread during the curing process. In this example, a tire retread package 803 having a retread and heating pad, along with tire core 801 is provided with one or more envelope portion plates 860 provided around the retread package. Each one of the clamps 860 is attached or otherwise connected to one or more pneumatic or hydraulic cylinders 855. A plurality of fitting clamps 850 have a portion that is provided underneath the girth of the tire for holding a respective adjustable fitting 865 between a pair of plates 860 to adjust the size (circumference) of the rim clamps 860 to adjust for different tire sizes.

The adjustable fittings 865 can be provided in various widths each adapted for a particular tire size, or they may have adjustable widths. These fittings 865 connect to the plates 860 using respective attachment arrangements 866, 867, which allow the fittings 865 to apply pressure to the entire retread package through the action of the plates 860. These fittings 865 might be secured to the plates 860 using a clip or bolt (not shown), for example, to ensure a secure connection, or the attachment arrangements 866, 867 can be configured into a locking design to ensure such secure connection. In some embodiments, the ring clamps 850 may not be needed, and hence can be left out. In other embodiments, the ring clamps 850 may provide a clamping force on the fittings 865 that is also transmitted to the plates 860 to supplement or even replace the force provided by the cylinders 855. The fittings 865 allow the same plates/piston system to be used for tires having various diameters.

In some cases, the fittings 865 may be sufficiently connected to the plates 860 so at to entirely avoid the need for using the fitting clamps 850, simplifying the design. Furthermore, use of the adjustable fittings could be applied to other embodiments disclosed herein, such as the embodiments of FIG. 6 and/or FIGS. 12A, 12B, and 20 for example.

By activating the cylinders 855 to extend a piston, the plates 860 in conjunction with the fittings 865, put pressure on the retread package 803 during the curing process, such that the cylinders will to push the tire tread into the tire casing during curing to ensure that a good bond forms. Overlap on the side edges of the retread to avoid extrusion of the adhesive, as discussed herein, may be provided. Although the Example embodiments show three plates 860 used along with three adjustable fittings and three ring clamps, different numbers of these components could be utilized. Furthermore, in some embodiments, heating may be provided by alternative plates 860 that incorporate heating elements, rather than using a separate heating pad. Furthermore, heating elements might also be provided in the adjustable fittings, which might receive power from the plates 860 via electrical connections. Hence, heat for curing can be applied by using one or more heating pad elements, or alternative means of heating. The heating pad elements may be held in place in any manner described herein or in an alternative manner. As described above, the heating pad elements may have data and power cables. Power will be provided by an external power supply, and the data cables will connect to a system controller to monitor and control the curing process. Pressure is applied using the cylinders may utilize hydraulic or air pressure, or electric pistons. With the pressure is thus applied using the plates 860, then heating can take place to cure the tire.

The plates, fitting clamps, and adjustable fittings might comprised of similar, or different materials, such as metals like aluminum or steel, or a strong composite material or plastic. In some instances, materials that conduct heat well may be desirable, such as in embodiments where heating elements are embedded within, or to supplement the heat transmission of the heating pads. Furthermore, they may be provided with sidewalls such as shown in FIG. 18 to prevent leakage of adhesive during curing, for example, and/or for better heat transmission.

The fitting clamp may have an adjustable end 867 for extending/retracting its end to install the clamp on the retread package. Or the end may be offset from the other end so that the fitting clamp can encompass the entire interior of the casing.

In order to accommodate the slight change in circumference that may occur as the rim clamps are pushed into the retread package, the adjustable fittings could be designed with some play in their connection with the rim clamps to allow this circumference change. Hence, the ring clamps may help keep the fittings in place, or the attachment arrangements (for example, a dovetail or similar designed fitting) may allow for this without the use of ring clamps by providing sufficient play in the resulting joint to allow for the change in circumference. This allows the rim clamps to be of a standard design, with different adjustable fittings being used for particular tire sizes. Alternatively, a few different sized rim clamps could be provided for use with an even wider variety of tire sizes in that not all rim clamps need be the same size, and different numbers could be utilized based on the overall tire size to be made.

FIG. 27 shows an alternative system 900 of the system of FIG. 6 or FIGS. 12a, 12b, that can utilize rigid pressure plates 913 with actuators 917 (e.g., hydraulic, pneumatic, or electric pistons or solenoids) to provide pressure to the tire tread during the curing process, but in this case the pressure is applied internal to the retread package 910 (with retread 915). A stand 905 in conjunction with hub 904 can be used in a compact system. In this case, pressure is applied to an interior of the casing sidewall rather than into the retread itself during the curing process. The retread package can be assembled as discussed above with an exterior and/or interior heating band and cushion gum applied in the manner described. The pistons 910 might be pneumatic, electric, or hydraulic pistons, for example, or springs that are loaded or unloaded using mechanical means.

Effectively, the device of FIG. 27 has expandable rim made of three of the plates 913 and respective actuators 917, and mounted on a stand is configured to apply pressure from inside the wall of the casing. The retread package is placed on IER and the actuators actuate into inside wall of casing applying pressure to retread package during curing.

Alternative approaches might use an inflatable bladder in place of the plates/pistons, or might be combined with a means of applying pressure directly into the retread 915 as well, such as described above or below.

FIGS. 28 & 29 show an alternative approach 950 to the system of FIG. 7 using three portions 952 that can be rigid plates or an envelope that encompasses retread package 910 (with retread 915) and uses screw claims 960 to clamp the portions 952 together to apply pressure to the retread package.

As shown in FIG. 29, the screw claim 960 is formed for use with a pair of portions 952 that are clamped together using a screw 961 passing through threaded portions 962, 963 found on respective portions 952. The screw head 965 can be rotated using a tool such as a screwdriver to tighten the clamp and provide the desired pressure.

Note that features of any of the above embodiments and example component designs might be "mixed and matched" in order to achieve the particular benefits of those respective embodiments, as desired.

Such a device is more environmentally friendly than the current approach, which consumes a large amount of energy to operate. This new process is calculated to uses less than 20 kw per tire of multiplied by 0.04 for power that is less than a $1.00 of power to cure a tire. Saving on energy cost is a challenge for retread shops today.

Production time is reduced because the heat is applied more efficiently then what is currently on the market which yields less heat up time to bring a faster cure time. The heat pads come up to the set point temp to begin heat transfer within 10 minutes. This enables reaching a migration bonding in the core in less than 30 mins.

By focusing the energy and heat by heating only what needs to be heated, energy use is reduced and cure times improved. Unlike the current systems using autoclaves that subject the entire tire of a whole set of tires to a set pressure and heat which causes undo bridling of side walls, this system keeps the heat where it needs to be and saves the life capacity and integrity of the tire.

Equipment costs are reduced. It is difficult to enable a small community to recycle tires due to the large set up costs using traditional autoclaves. This system is cost effective in that it can be sized for various production sizes based on available funding. Savings on floor space and low initial startup costs allow a large retreater to put more tires into a production, using more rubber while producing faster and increasing profit.

Versatility is improved because no set amount or batch of tires is needed to reach a conformed temp, pressure, and time, this provides flexibility to cure as many tires as needed, pulling continually each tire on its on customize temp, pressure, and time, rather than by batch. The system is easily manageable on a touch screen control system, for example. If a tire is having a problem it is isolated from causing a problem from an entire batch of tires.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A method for performing a tire retread on an individual tire, comprising the steps of:
   placing a layer of adhesive on an outer surface of a tire casing or on an inner surface of a retread, said retread having a tread pattern on a surface thereof;
   placing the retread on the tire casing with the adhesive layer between the retread and the tire casing to form a retread package;
   providing a heating device around an exterior circumference of the retread package, said heating device configured to heat the retread package using electrical heating elements, wherein said heating device is a flexible heating pad, wherein said heating device includes a durable layer configured to withstand compression against an uneven surface, said durable layer provided against the tread pattern on the retread;

applying pressure to the retread package using a device to provide a force into the retread package with the heating device over the retread and under the device for providing said force to compress the adhesive layer between the tire casing and the retread; and while applying said force, using the heating device to heat the retread package to cure said adhesive and bind said retread to said tire casing.

2. The method of claim 1, wherein said heating device includes a temperature sensor with said method further comprising the step of monitoring a temperature of at least a portion of said retread package during the heating step.

3. The method of claim 1, further comprising the step of placing another heating device into an interior of the tire casing, wherein, while applying said force, also using the other heating device to heat the retread package to cure said adhesive.

4. The method of claim 1, wherein said force is provided by at least partly encircling said retread package with the device for providing said force and providing a mechanical force to the retread using said device for providing said force.

5. The method of claim 4, wherein said mechanical force is at least partly provided by a piston pushing against a rigid plate in contact with said retread package via said heating device.

6. The method of claim 5, wherein said force is provided by a plurality of pistons, each one of said pistons being associated with one of a plurality of plates, each one of said plates provided in contact with an outer circumference of said retread package via said heating device.

7. The method of claim 4, wherein said mechanical force is provided by a clamp.

8. The method of claim 1, wherein the durable layer is comprised of a metal.

9. The method of claim 1, wherein the durable layer is comprised of aluminum.

10. The method of claim 1, wherein the durable layer is removable and replaceable from the heating pad.

11. The method of claim 1, further comprising the steps of:
providing a plurality of rigid plates;
providing a plurality of fittings of different sizes;
selecting one of the plurality of fittings of a size based on a size of the individual tire; and
connecting one of said rigid plates to an adjacent other one of said rigid plates using the selected fitting to accommodate the size of the individual tire, wherein the force to compress the retread package is provided by pushing the rigid plates into the retread package.

12. A method for performing a tire retread on an individual tire, comprising the steps of:
placing a layer of adhesive on an outer surface of a tire casing or on an inner surface of a retread, said retread having a tread pattern on a surface thereof;
placing the retread on the tire casing with the adhesive layer between the retread and the tire casing to form a retread package;
providing a flexible heating pad around an exterior circumference of the retread package, said heating pad including a temperature sensor, said heating pad configured to heat the retread package using electrical heating elements, wherein said heating pad includes a durable layer configured to withstand compression against an uneven surface, said durable layer provided against the tread pattern on the retread;
applying pressure to the retread package using one or more rigid plates to provide a force into the retread package, with the heating pad positioned under the one or more rigid plates and over the retread, said force configured to compress the adhesive layer between the tire casing and the retread; and
while applying said force, using the heating pad to heat the retread package to cure said adhesive and bind said retread to said tire casing while monitoring a temperature of at least a portion of said retread package during the heating step using a control system.

13. The method of claim 12, wherein said force is provided by a plurality of pistons, each one of said plurality of pistons being associated with one of the one or more of said rigid plates, each one of said plates provided in contact with an outer circumference of said retread package via said heating pad.

14. The method of claim 12, further comprising the steps of:
providing a plurality of fittings of different sizes;
selecting one of the fittings based on a size of the individual tire; and
connecting one of said one or more rigid plates to an adjacent other one of said one or more rigid plates using the selected fitting to accommodate the size of the individual tire.

15. The method of claim 12, further comprising the step of providing a plurality of pistons, each one of said plurality of pistons being associated with one of said one or more rigid plates.

16. A method for performing a tire retread on an individual tire, comprising the steps of:
placing a layer of adhesive on an outer surface of a tire casing or on an inner surface of a retread, said retread having a tread pattern on a surface thereof;
placing the retread on the tire casing with the adhesive layer between the retread and the tire casing to form a retread package;
providing a flexible heating pad around an exterior circumference of the retread package, said heating pad including a temperature sensor, said heating pad configured to heat the retread package using electrical heating elements, wherein said heating pad includes a durable layer configured to withstand compression against an uneven surface, said durable layer provided against the tread pattern on the retread;
providing a plurality of rigid plates;
providing a plurality of fittings;
connecting each one of said plurality of rigid plates to an adjacent other one of said plurality of rigid plates using a respective at least one of said adjustable fittings to link said plurality of rigid plates together;
applying pressure to the retread package via said plurality of rigid plates that are connected together to provide a force into the retread package, with the heating pad positioned under the rigid plates and over the retread, said force configured to compress the adhesive layer between the tire casing and the retread; and
while applying said force, using the heating pad to heat the retread package to cure said adhesive and bind said retread to said tire casing while monitoring a temperature of at least a portion of said retread package during the heating step using a control system.

17. The method of claim 16, wherein said plurality of fittings includes fittings of different sizes, said method further including the step of selecting fittings from said plurality of fittings based on a size of the individual tire, wherein the selected fittings are used to connect the ones of said plurality of rigid plates to the adjacent ones of said plurality of rigid plates.

18. The method of claim 16, wherein said force is provided by a plurality of pistons, each one of said pistons being associated with a respective one of the rigid plates.

19. A method for performing a tire retread on an individual tire, comprising the steps of:
- placing a layer of adhesive on an outer surface of a tire casing or on an inner surface of a retread, said retread having a tread pattern on a surface thereof;
- placing the retread on the tire casing with the adhesive layer between the retread and the tire casing to form a retread package;
- providing a flexible heating pad around an exterior circumference of the retread package, said heating pad including a temperature sensor, said heating pad configured to heat the retread package using electrical heating elements;
- applying pressure to the retread package using one or more rigid plates to provide a force into the retread package, with the heating pad positioned under the one or more rigid plates and over the retread, said force configured to compress the adhesive layer between the tire casing and the retread; and
- while applying said force, using the heating pad to heat the retread package to cure said adhesive and bind said retread to said tire casing while monitoring a temperature of at least a portion of said retread package during the heating step using a control system.

* * * * *